United States Patent
Coakley et al.

(10) Patent No.: US 8,692,504 B2
(45) Date of Patent: Apr. 8, 2014

(54) APPARATUS AND METHODS FOR DETERMINING AN INITIALLY UNKNOWN COMMUTATION POSITION OF A MEMBER MOVED BY A PLANAR MOTOR

(75) Inventors: Scott Coakley, Belmont, CA (US); Radka Tezaur, Fremont, CA (US)

(73) Assignee: Nikon Corporation, Tokyo (JP)

( * ) Notice: Subject to any disclaimer, the term of this patent is extended or adjusted under 35 U.S.C. 154(b) by 258 days.

(21) Appl. No.: 13/228,254

(22) Filed: Sep. 8, 2011

(65) Prior Publication Data

US 2012/0074890 A1 Mar. 29, 2012

Related U.S. Application Data

(60) Provisional application No. 61/381,019, filed on Sep. 8, 2010.

(51) Int. Cl.
  *G05B 1/02* (2006.01)
(52) U.S. Cl.
  CPC ............. *G05B 1/02* (2013.01)
  USPC ........... 318/653; 318/652; 318/638; 318/560
(58) Field of Classification Search
  CPC .................................. H02K 2201/18
  USPC .................. 318/653, 652, 638, 560
  See application file for complete search history.

(56) References Cited

U.S. PATENT DOCUMENTS

| | | | |
|---|---|---|---|
| 1,778,796 A | 10/1930 | Craig | |
| 6,650,079 B2 * | 11/2003 | Binnard | 318/649 |
| 6,847,134 B2 | 1/2005 | Frissen et al. | |
| 7,170,203 B2 * | 1/2007 | Cheung et al. | 310/12.18 |

\* cited by examiner

*Primary Examiner* — Bentsu Ro
*Assistant Examiner* — David Luo
(74) *Attorney, Agent, or Firm* — Klarquist Sparkman, LLP

(57) ABSTRACT

An exemplary stage apparatus has a motor, stage, and position-measuring device. The motor has a planar stator and moving-coil mover (planar motor). The stator is a checkerboard magnet array extending in an x-y plane and producing a magnetic field having a field period of $2\pi$ in a u-v coordinate system rotated 45° from the x-y coordinate system of the plane. The stage, coupled to the mover, moves with corresponding motions of the mover relative to the stator. The position-measurement device includes a first group of four magnetic-field sensors that are movable with the stage. The sensors are situated at integer multiples of $\pi/2$ from each other in u- and v-directions of the u-v coordinate system. The sensors produce respective data regarding a respective component of the magnetic field at, and hence the position of, the respective sensor within the period of the magnetic field.

31 Claims, 16 Drawing Sheets

APPARATUS AND METHODS FOR DETERMINING AN INITIALLY UNKNOWN COMMUTATION POSITION OF A MEMBER MOVED BY A PLANAR MOTOR

CROSS-REFERENCE TO RELATED APPLICATION

This application claims priority to, and the benefit of, U.S. Provisional Patent Application No. 61/381,019, filed on Sep. 8, 2010, which is incorporated herein by reference in its entirety.

FIELD

This disclosure pertains to, inter alia, planar actuators for moving a body in a controlled manner, as used in various precision systems such as, but not limited to, microlithography systems. More specifically, the disclosure pertains to planar motors having a stator, or stationary, portion and a mover. The stator is configured as an ordered planar array of magnets relative to which a moving-coil mover is movable whenever the mover is appropriately energized electrically. Even more specifically, the disclosure pertains to determining a position of a member moved by the mover relative to the stator of a moving-coil planar motor.

BACKGROUND

In precision systems that perform operations on workpieces and the like, the workpiece is placed on, held by, and moved as required by a stage or other device that undergoes controlled motion relative to a tool, optical system, energy source, or other implement that performs the operation(s) on the workpiece. Such motion can be achieved by any of various actuators, but linear motors have become favored due to their wide range of motion, accuracy, precision, reliability, and simplicity. A linear motor is an electromagnetic actuator in which the stator extends in a substantially one-dimensional (linear) manner and in which the mover moves relative to the stator in either direction within the one dimension. In a moving-coil linear motor, the stator is a linear array of permanent magnets and the mover comprises a linear array of wire coils that, when electrically actuated, moves relative to the magnet array.

A planar motor is similar to a linear motor in many aspects, but the stator of a planar motor extends in a substantially two-dimensional (planar) manner and the mover moves relative to the stator in substantially any direction within the two dimensions. In a moving-coil planar motor, the stator is a planar array of permanent magnets and the mover comprises a two-dimensional array of wire coils. Planar motors, as well as linear motors, operate very accurately and precisely, especially in conjunction with displacement- and position-measuring devices such as encoders and interferometers.

Modern microlithography systems have at least one movable stage (e.g., a "reticle stage" or "wafer stage" or "substrate stage"). For actuations of these stages, linear motors are widely used. The substrate stage or wafer stage is often substantially larger than the reticle stage, and in certain microlithography systems is quite massive. Especially for these applications, planar motors are being favorably considered.

Initialization of the wafer stage of a microlithography system must be performed each time the system is restarted. During a conventional restart, the location and orientation of the wafer stage are unknown to the system. Since the primary metrology system for a wafer stage usually involves relative measurements (i.e., interferometry), the initialization process requires movement of the stage to and measurement of a known absolute position to establish a reference origin. Typically, a conventional initialization includes moving the stage to a set of initialization sensors that can determine an initial absolute orientation and position of the stage, but have a very limited measurement range. Movement of the stage to the initialization sensors can often be performed manually, but this manual initialization procedure is cumbersome and time-consuming.

Stages for conventional lithography systems typically utilize air bearings to support the stage and stacked linear motors to provide large-amplitude motions of the stage in the two main movement directions (x and y). Whereas a stage driven by linear motors can be equipped with absolute encoders along the motor axes to provide data on approximate commutation positions, this procedure is impractical for use with a stage driven by a planar motor.

Recently, substantial development effort has been directed to use of planar motors for producing stage movement at least in the x- and y-directions. A planar motor is similar in certain ways to a linear motor; but, a planar motor provides significant motion in two dimensions (x and y; "2-D") rather than in one dimension as achieved by a linear motor. The motions produced by a moving-coil planar motor are relative to an x-y (planar; 2-D) array of magnetic fields (nowadays produced by a corresponding array of permanent magnets). The magnet array constitutes the stator and hence is part of the planar motor.

The movable portion of a moving-coil planar motor (together with any mass being carried by the movable portion) is typically magnetically levitated relative to the planar array of magnets. Commutation requires "knowledge" of the stage's position, relative to the magnetic-field array, in both the x- and y-directions. This data must be obtained before the movable portion of the planar motor can be levitated or moved at all. In contrast to linear motors, with a maglev planar motor no mechanical guide is used to control yaw ($\theta_z$ motions) during movements of the stage. Hence, a yaw measurement is also required (in addition to the x- and y-position measurements) to initiate stable levitation and movement of the stage.

Accurate measurement of stage position involves measurements in all six possible degrees of freedom, namely x, y, z, $\theta_x$, $\theta_y$, $\theta_z$. If the stage is being moved in the y-direction, $\theta_x$ denotes pitch and $\theta_y$ denotes roll associated with the y-direction main motion. For one conventional stage system, z-position, $\theta_x$, and $\theta_y$ are measured using capacitive sensors attached to the stage itself. Since these sensors move with the stage, they are always available to provide respective their respective data regardless of the stage position. But, these sensors do not provide x-position, y-position, or $\theta_z$ data for initialization. (Note that $\theta_x$, $\theta_y$, and $\theta_z$ are also termed Tx, Ty, and Tz, or theta-x, theta-y, and theta-z, respectively.) For measuring x-position, y-position, and $\theta_z$ for initialization, other sensors ("initialization sensors") have been tried; but, since the initialization sensors are fixed at the initialization position, they can be used only after the stage has been moved to the initialization position.

It is impractical in a production microlithography machine to include a device for (or manually) moving the stage to an initialization position each time initialization is required. Eliminating such a device does not eliminate the need to obtain initial x-position, y-position, and $\theta_z$ data for the stage.

SUMMARY

A first aspect of the invention is directed to stage apparatus, of which an exemplary embodiment comprises a motor comprising a planar stator and a moving-coil mover. The stator is a checkerboard magnet array that extends in an x-y plane and that produces a periodic magnetic field having a magnetic-field period of $2\pi$ in a u-v coordinate system. The u-v coordinate system is rotated 45° from the x-y coordinate system of the plane. A stage is coupled to the mover so as to move with corresponding motions of the mover relative to the stator. The apparatus includes a position-measurement device that comprises at least a first group of four magnetic-field sensors (e.g., Hall-effect sensors). The sensors are coupled to the stage so as to be movable with the stage. The magnetic-field sensors are situated at integer multiples of $\pi/2$ from each other in respective u- and v-directions of the u-v coordinate system. The sensors produce respective data regarding respective z components of the magnetic field at the sensor locations. Hence, the sensors produce respective data regarding the positions of the sensors within the period of the magnetic field.

The four sensors in the first group can be used for measuring position of the stage, but are not generally sufficient for measuring stage yaw. Hence, the position-measurement device desirably further comprises a second group of four magnetic-field sensors that are mounted so as to be movable with the stage along with the first group but spaced apart from the first group. The sensors of the second group are situated at integer multiples of $\pi/2$ from each other in the u- and v-directions. The sensors of the second group produce respective data regarding respective components of the magnetic field at the sensors. The data from the second group are compared to the data from the first group in a determination of stage yaw.

Desirably, especially for ease of construction, the sensors in each group are situated on the periphery of the stage. The sensors in each group are situated closely together (while preserving the phase separation of integer multiples of $\pi/2$). This arrangement simplifies the calculations and reduces possible adverse consequences of ignoring stage rotation during determination of stage position. The sensors in the second group desirably are not located near the first group. Rather, the two groups desirably are located as far apart as practicable to ensure the highest accuracy in determinations of stage rotation (yaw).

The apparatus can further comprise a processor that is operably connected to the sensors. The processor is configured (e.g., by hardware, firmware, and/or software) to determine, from the data received from the sensors, respective $B_z$ fields at the sensors. The processor also converts the $B_z$ data to corresponding u-v coordinates, and converts the u-v coordinates to respective x-y coordinates.

According to another aspect, apparatus are provided for determining an x-y commutation position of a mover of a moving-coil planar motor of which a stator is a checkerboard magnet array extending in an x-y plane. The stator produces a periodic magnetic field having a magnetic-field period of $2\pi$ in a u-v coordinate system that is rotated 45° from an x-y coordinate system of the plane. The apparatus comprises a first group of four magnetic-field sensors mounted so as to be movable with the mover. The sensors are situated at integer multiples of $\pi/2$ from each other in u- and v-directions of the u-v coordinate system. Each sensor produces respective data regarding a respective component of the magnetic field at the respective sensor. The apparatus also includes a processor that is operably connected to the sensors. The processor is configured to determine, from the data received from the sensors, respective $B_z$ fields at the sensors. The processor also converts the $B_z$ data to corresponding u-v coordinates, and converts the u-v coordinates to respective x-y coordinates.

The apparatus can further comprise a stage that is coupled to the mover, wherein the four sensors of the first group are mounted on a periphery of the stage. Desirably, the four sensors of the first group are mounted on respective locations on one or more edges of the stage adjacent a first corner of the stage.

The processor can be further configured to resolve a situation in which a u or v coordinate could be either of two values out of phase by an integer multiple of $\pi/2$ relative to each other. The processor resolves this situation by obtaining respective data from the four sensors of the group for each value. The processor determines predicted $B_z$ values for each sensor and determines which predicted $B_z$ value better matches the respective data produced by the four sensors.

The apparatus can further comprise a second group of four magnetic-field sensors that are mounted so as to be movable with the mover along with the first group but spaced apart from the first group. The sensors are situated at integer multiples of $\pi/2$ from each other in the u- and v-directions. The sensors of the second group produce respective data regarding respective components of the magnetic field at the respective sensor.

Desirably, the sensors of the second group are connected to the processor. If so, the processor is further configured to determine, from the data received from the sensors, respective $B_z$ fields at the sensors. The processor also converts the $B_z$ data to corresponding u-v coordinates, and compares the u-v coordinates from the second group with the u-v coordinates obtained by the first group to determine a difference in the coordinates. From the difference, the processor can calculate the yaw of the mover.

The sensors in first group can be arranged in a basic arrangement in which a first sensor of the group has u-v coordinates $(u_0, v_0)$, a second sensor of the group has u-v coordinates $(u_0, v_0+\pi/2)$, a third sensor has u-v coordinates $(u_0+\pi/2, v_0+\pi/2)$, and the fourth sensor of the group has u-v coordinates $(u_0+\pi/2, v_0)$.

In another embodiment the sensors in the first group are arranged in an arrangement in which the first sensor of the group has u-v coordinates $(u_0, v_0)$, the second sensor of the group has u-v coordinates $(u_0+j_B\pi, v_0+\pi/2+k_B\pi)$, the third sensor of the group has u-v coordinates $(u_0+\pi/2+j_C\pi, v_0+\pi/2+k_C\pi)$, and the fourth sensor of the group has u-v coordinates $(u_0+\pi/2+j_D\pi, v_0+k_D\pi)$, wherein $j_B, j_C, j_D, k_B, k_C,$ and $k_D$ are integers. Again, the sensors in the first group are respective Hall-effect sensors.

According to yet another aspect, methods are provided for determining a position of an x-y commutation position of a stage coupled to a mover of a moving-coil planar motor. In the planar motor the stator is a checkerboard magnet array extending in an x-y plane. The stator produces a periodic magnetic field having a magnetic-field period of $2\pi$ in a u-v coordinate system that is rotated 45° from an x-y coordinate system of the plane. An exemplary embodiment of the method comprises placing a first group of four magnetic-field sensors so as to be movable with the mover. The sensors are placed at integer multiples of $\pi/2$ from each other in u- and v-directions of the u-v coordinate system. From the first group a reference sensor is selected. A respective $B_z$ magnetic field at the reference sensor and at one or more of the remaining sensors in the first group are determined. The $B_z$ data are converted to corresponding u and v coordinates. The u and v coordinates are mapped onto corresponding x and y coordinates of the commutation position, thereby providing a determination of the location of the stage in x, y coordinates.

The method desirably further comprises determining yaw of the stage. The determination of yaw comprises placing a second group of four magnetic-field sensors so as to be movable with the mover. The sensors are placed at integer multiples of π/2 from each other in u- and v-directions of the u-v coordinate system. A reference sensor is selected from the second group, wherein that reference sensor corresponds to the reference sensor of the first group. The reference sensor of the second group is located on a line extending at 45° or 135° relative to an x-direction line of the magnet array. A respective $B_z$ magnetic field at, at least, the reference sensor of the second group of sensors is determined. The $B_z$ data is converted to corresponding u and v coordinates. The u and v coordinates obtained from the second group are compared with the u and v coordinates obtained from the first group. Based on a difference in respective u and v coordinates obtained from the first and second groups, the yaw of the mover can be determined.

The foregoing and additional features and advantages of the invention will be more apparent from the following detailed description, which proceeds with reference to the accompanying drawings.

DETAILED DESCRIPTION

Figure 1:
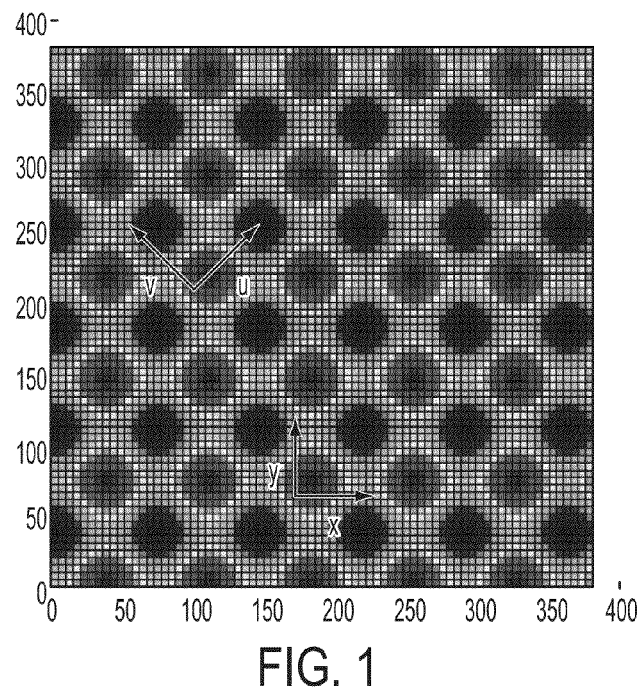
FIG. 1 is a plan view of the two-dimensional $B_z$ magnetic field array produced by the stator of a representative planar motor. Shown also are the x, y axes of mover motion relative to the stator and the u, v axes of periodicity of the magnetic field. The stator is a 2-D array of permanent magnets arranged with alternating poles in each of the u and v directions. Note that the u and v axes are rotated 45° relative to the x and y axes, respectively.

This disclosure is set forth in the context of representative embodiments that are not intended to be limiting in any way.

As used in this application and in the claims, the singular forms "a," "an," and "the" include the plural fowls unless the context clearly dictates otherwise. Additionally, the term "includes" means "comprises." Further, the term "coupled" encompasses mechanical as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed things and methods are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In the following discussion, a "stage" is a member (e.g., a platform for holding a workpiece such as a lithographic substrate) that is coupled to the mover of the moving-coil planar motor and that moves with the mover relative to the stator.

The "stator" of a moving-coil planar motor as discussed herein is a planar (2-D, x-y) array of permanent magnets arranged in a checkerboard pattern of N-S poles. The checkerboard pattern is arranged at 45° relative to the x- and y-axes of mover motion.

Various representative embodiments of a position-sensing device comprise respective arrangements of local-magnetic-field sensors situated on the mover or stage. Data from the sensors are processed to provide a measurement of x-y position, and also yaw ($\theta_z$) if desired, of the stage. These measurements are particularly useful for providing initial position and yaw data that allow use of the stage to commence. The sensors are local-magnetic-field sensors that sense at least one vector component of the magnetic field. The sensors desirably are Hall-effect sensors. Available Hall-effect sensors come in small sizes and are capable of detecting magnetic fields accurately and precisely. In an embodiment configured for unambiguously determining only the x-y aspect of mover position, four sensors are used. In an embodiment configured for unambiguously determining x-y position and yaw, eight sensors are used. The sensors are arranged in one or two groups of four, respectively. The sensors in a single group are relatively close to each other. If eight sensors are employed, the two groups desirably are spaced well apart from each other. The position-measurements obtained by these embodiments allow automatic starting of the levitation and motion of the stage from substantially any arbitrary starting position, without having first to move the stage to an initialization position. The subject apparatus are particularly useful if the range of yaw angle ($\theta_z$) of the stage is small.

The sensors desirably are mounted to the stage for convenience, even more desirably to respective locations on the periphery of the stage, but they alternatively can be mounted anywhere on the stage or mover where they can sense the magnetic fields being produced by the stator. The direction of the field is in the z-direction (called the $B_z$ field), and is periodic with respect to polarity and magnitude in most x-y directions. In the array the magnets are arranged so that N poles alternate on all sides with S poles and S poles alternate on all sides with N poles (FIG. 1). Thus, in substantially any x-y direction, the strength and direction (N or S) of the magnetic fields produced by the magnets vary sinusoidally as functions of x-y distance across the plane of the array. Note that maximum sinusoidal amplitude occurs in directions that are 45° from the x-y axes. This is shown in FIG. 1, in which magnetic fields exhibiting maximal sinusoidality are aligned with u- and v-axes that are rotated 45° from the respective x- and y-axes. In FIG. 1, only a small portion of the usual permanent-magnet array is shown.

The subject apparatus determine commutation position within one period of the magnetic field, analogous to the commutation position of an armature of a rotary motor. The magnetic-field period repeats across the magnet array of the stator to allow the planar motor to produce the desired motive force in the desired x, y, and z directions.

First Representative Embodiment

Figure 2:
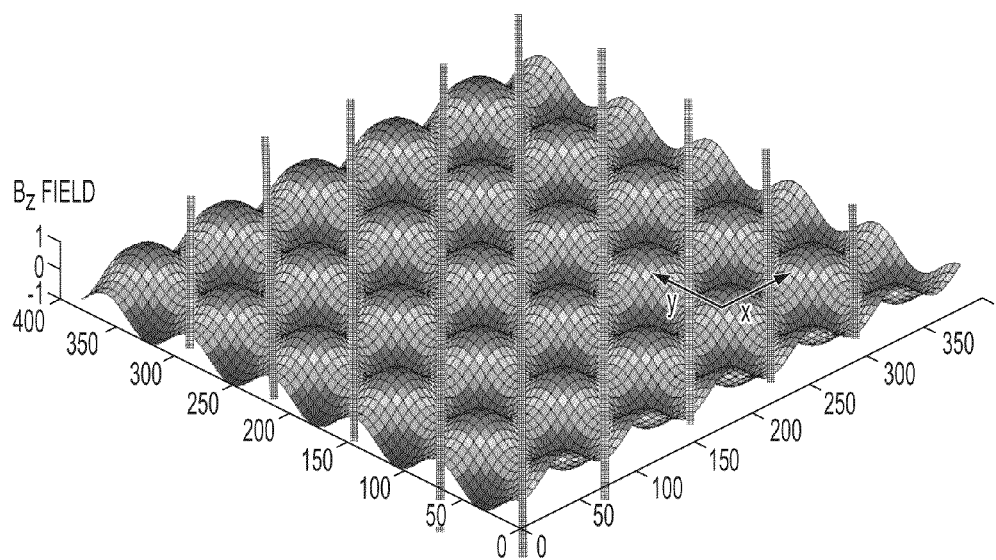
FIG. 2 is a perspective view of the array shown in FIG. 1, showing lines of equal field magnitude and direction.

As stated above, in substantially any x-y direction the magnetic field collectively produced by the magnet array varies sinusoidally as a function of x-y distance across the plane of the array. The directions of maximum sinusoidality are in the u- and v-directions (FIG. 2). As discussed above, the u- and v-directions are at 45° to the respective x- and y-directions. FIG. 2 shows that there are lines of zero field in each of the u- and v-directions. These lines are spaced $\pi/2$ apart. In the u- and v-directions the field sinusoids (plots of local magnetic-field strength and direction versus distance) have a pitch equal to $2\pi$.

The sinusoidal aspect of the magnetic field in various directions across the magnet array allows use of magnetic-field sensors to measure stage position within one period of the magnetic field. A Hall-effect sensor is an exemplary magnetic-field sensor. It varies its output voltage in response to corresponding changes in a nearby magnetic field. In this embodiment each Hall-effect sensor measures the magnetic field produced by the permanent magnet(s) directly beneath it on the stator. For measuring only x- and y-positions unambiguously, four sensors are utilized. For measuring x- and y-positions as well as yaw unambiguously, eight Hall sensors are utilized. The sensors are arranged in one or two groups of four, respectively, placed in respective locations on the stage, as discussed in more detail below. Even though the sensors provide respective measurement data (x, y, and $\theta_z$) that are within a few mm of actual stage position, this accuracy is sufficient for initiating levitation of the stage relative to the magnet array.

Figure 3:
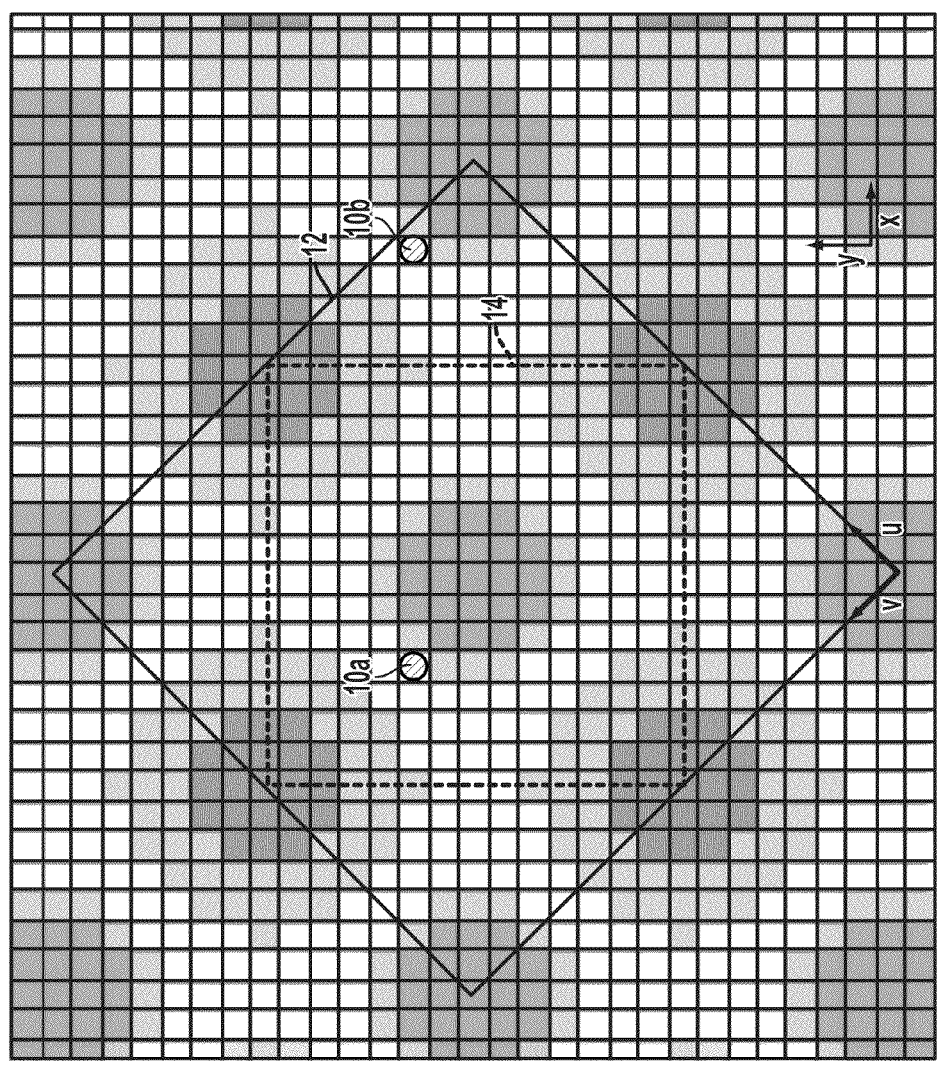
FIG. 3 is a plan view of a region of the stator, depicting respective regions of one magnetic pitch in each of the x, y and u, v directions. The two dots denote regions in which the $B_z$ field is identical and that must be distinguished from each other to achieve accurate determination of initial position.

If the u and v coordinates are normalized so that they range from 0 to $2\pi$ over the pitch of the magnetic field, the magnetic field at any (u, v) coordinate can be approximated by $B_z(u, v) = \beta \cdot \sin(u) \cdot \sin(v)$, wherein $0 \leq u \leq 2\pi$ and $0 \leq v \leq 2\pi$. FIG. 3 shows that, regardless of the u and v coordinates actually obtained, no distinction can be made between the respective positions of the two points 10a, 10b because the $B_z$ field is identical at both locations. FIG. 3 shows a smaller portion of the magnet array than shown in FIGS. 1 and 2. The square 12 encompasses one period in u-v coordinates, wherein u=[0, $2\pi$] and v=[0, $2\pi$]. The other square 14 shows one period encompassed in x-y coordinates. Note that the area of the square 12 is twice the area of the square 14.

Figure 4:
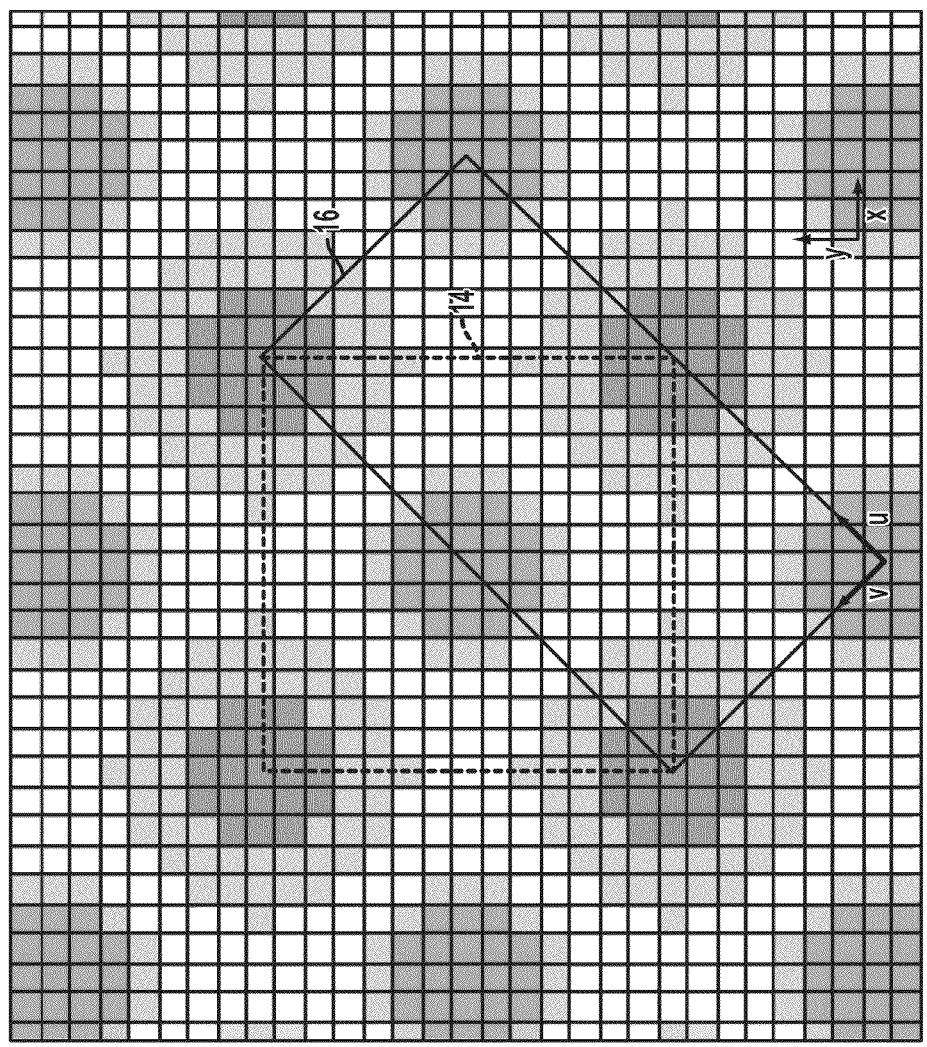
FIG. 4 is a plan view of a region of the stator, showing a region in which, in u, v coordinates, $B_z$ is actually periodic, compared to a region in which the x, y coordinates are periodic. Note that the respective areas of the two rectangles are equal.

FIG. 4 shows that, in the u- and v-directions, $B_z$ is periodic in the rectangle 16, which is half the size of the square 12 shown in FIG. 3. Hence, in the rectangle 16, u=[0, $2\pi$] and v=[0, $\pi$]. The square 14 delineates one period in each of the x- and y-directions. Note that the respective areas of the rectangle 16 and the square 12 are now equal, which is required for coordinate mapping.

Figure 5:
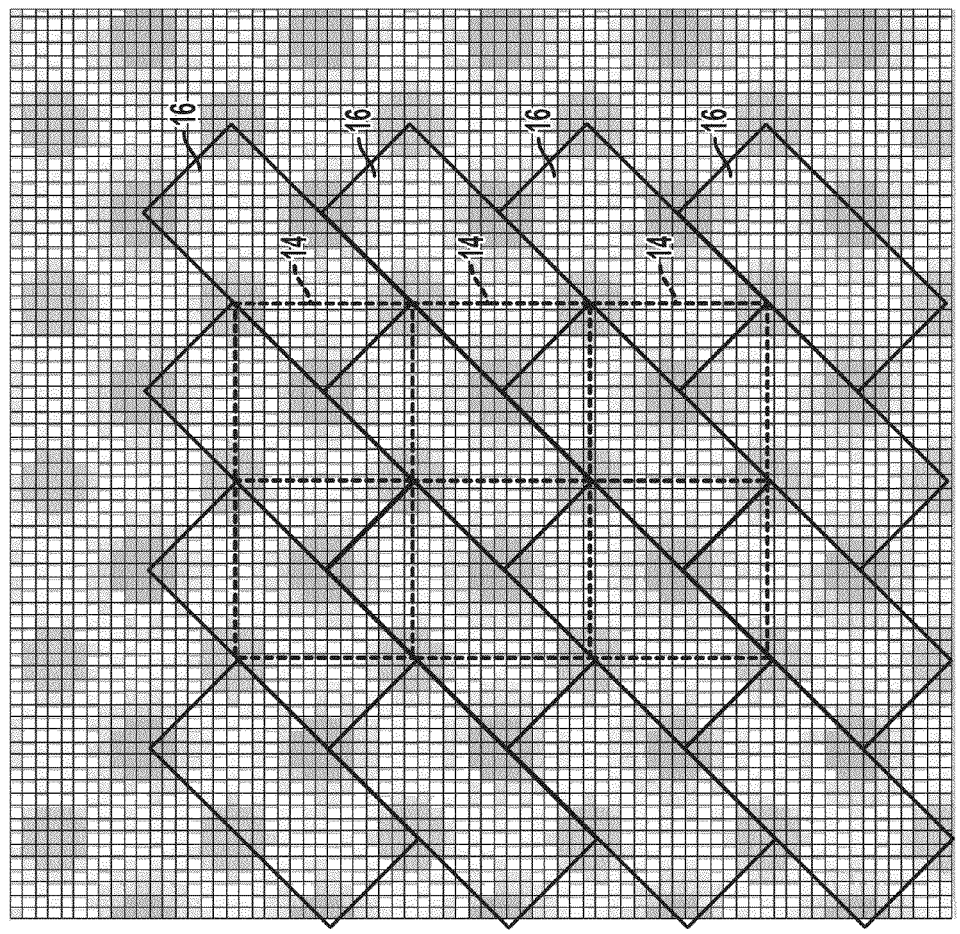
FIG. 5 is a plan view of a region of the stator, showing multiple regions in which, in u, v coordinates, $B_z$ is actually periodic and multiple regions in which the x, y coordinates are periodic.

Referring now to FIG. 5, it can be seen that the u-v coordinates cyclically repeat with stage motion over successive rectangles 16. Similarly, the x-y (commutation) coordinates cyclically repeat with stage motion over successive squares 14.

Figure 6:
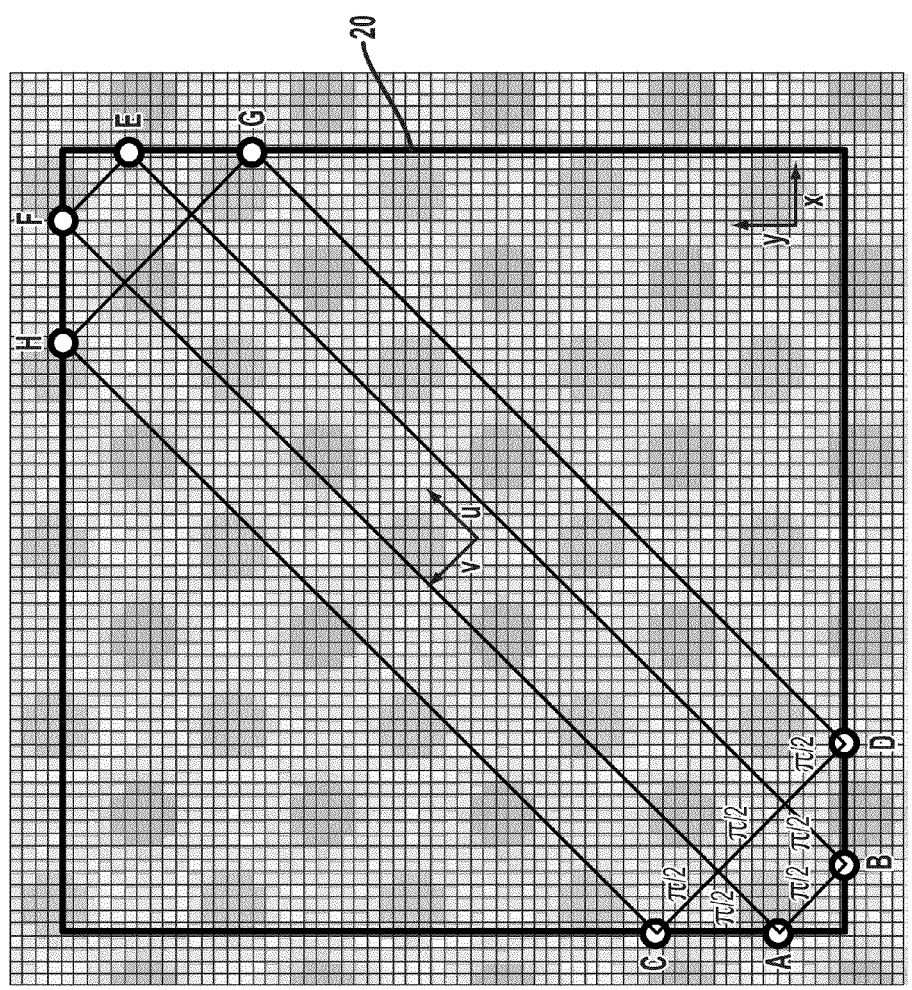
FIG. 6 is a plan view of a region of the stator showing respective locations, on a stage member that is movable relative to the stator, of Hall sensors mounted to the stage member. The stage member can be anywhere on the stator.

Since this embodiment is configured for determining both position and yaw of the stage, eight sensors are used. In FIG. 6 the sensors are labeled A, B, C, D in the lower left corner and E, F, G, H in the upper right corner of the stage 20.

The sensors in each group of four are located relatively closely together (which is desired for obtaining measurements of stage position) and the two groups are located relatively far apart (which is desired for obtaining measurements of stage yaw). By keeping the sensors in each group (e.g., A-D) close together, any effect of stage yaw on the outcome of calculations set forth below is minimized. By placing the two groups of sensors relative far apart, stage yaw can be determined more accurately. The sensors in each group are spaced apart from each other (in the u-v coordinate system) by $\pi/2$ or integer multiple thereof. The distance $\pi/2$ is one-fourth the distance ($2\pi$), in the u- and v-directions, between adjacent similar poles, such as between adjacent N-poles or between adjacent S-poles of the magnet array. These u-v positions can be correlated to x-y positions. For example, if $2\pi=25.46$ mm, then $(¼)(2\pi)=\pi/2=6.355$ mm. In FIG. 6, sensor B is placed $(\pi/2)/(2)^{1/2}=4.494$ mm in the +x-direction from the lower left corner of the stage 20, and sensor A is placed $6.355/(2)^{1/2}=4.494$ mm in the +y-direction from the lower left corner of the stage. Sensor D is placed $4.494+2(6.355)/(2)^{1/2}=13.481$ mm in the +x-direction from the lower left corner of the stage 20, and sensor C is placed $4.494+2(6.355)/(2)^{1/2}=13.481$ mm in the +y-direction from the lower-left corner of the stage.

Similarly, in FIG. 6 the sensor F is situated $(\pi/2)/(2)^{1/2}=4.494$ mm in the −x-direction from the upper right corner of the stage 20, and the sensor E is situated $6.355/(2)^{1/2}=4.494$ mm in the −y-direction from the upper right corner of the stage. The sensor H is placed $4.494+2(6.355)/(2)^{1/2}=13.481$ mm in the −x-direction from the upper-right corner of the stage 20, and the sensor G is placed $4.494+2(6.355)/(2)^{1/2}=13.481$ mm in the −y-direction from the upper-right corner of the stage. Again, the distance $\pi/2$ is ¼ the distance ($2\pi$), in the u- or v-direction, between adjacent similar poles, such as between adjacent N-poles or between adjacent S-poles of the magnet array. For example, if $2\pi=25.46$ mm, then $(¼)(2\pi)=\pi/2=6.355$ mm.

The z-component of a magnetic field B at a given location (u, v) can be denoted and approximated by:

$$B_z(u,v) = \beta \cdot \sin(u) \cdot \sin(v) \quad (1)$$

Any sensor A-D can be selected as a "calculation origin" or "reference sensor" used for determining position of the stage 20. For example, using the sensor A as the calculation origin, the respective z-components of the field $B_z$ at sensors A-D can be expressed as follows, with A having the coordinates (u, v), and the yaw angle $\theta_z$ being assumed to be zero:

$$B_z(A) = \beta \cdot \sin(u) \cdot \sin(v) \quad (2)$$

$$B_z(B) = -\beta \cdot \sin(u) \cdot \cos(v) \quad (3)$$

$$B_z(C) = \beta \cdot \cos(u) \cdot \cos(v) \quad (4)$$

$$B_z(D) = -\beta \cdot \cos(u) \cdot \sin(v) \quad (5)$$

in which $\beta$ is a constant defining the amplitude of the field. Equations (2)-(5) are applicable for any (u, v) position of the stage 20 relative to the magnet array because of the presence of and relative spacing of the sensors A-D. Hence, the relative spacings and arrangement of the sensors are important.

The following are applicable from Equations (2), (3), and (5):

$$\frac{B_Z(A)}{B_Z(D)} = \frac{\sin(u) \cdot \sin(v)}{-\cos(u) \cdot \sin(v)} = -\tan(u) \quad (6)$$

and $$\frac{B_Z(A)}{B_Z(B)} = \frac{\sin(u) \cdot \sin(v)}{-\sin(u) \cdot \cos(v)} = -\tan(v). \quad (7)$$

These equations (6) and (7) depend upon the $\pi/2$ spacing of the sensors A, B, C, and D from each other in the u- and v-directions. Hence, as discussed above, the relative positions and spacings of the sensors A, B, C, and D from each other are important.

From Equations (6) and (7), $$u = \tan^{-1}\left(-\frac{B_Z(A)}{B_Z(D)}\right) + \frac{n\lambda}{\pi}, \text{ except when } \sin(v) = 0 \quad (8)$$

$$v = \tan^{-1}\left(-\frac{B_Z(A)}{B_Z(B)}\right) + \frac{m\lambda}{\pi}, \text{ except when } \sin(u) = 0 \quad (9)$$

wherein n and m are respective integers, and $\lambda$ is the field pitch. Note that other ratios (e.g., $$\frac{B_Z(B)}{B_Z(C)}, \frac{B_Z(B)}{B_Z(A)},$$

etc.) can be expressed readily from Equations (2)-(5), as needed.

Figure 7:
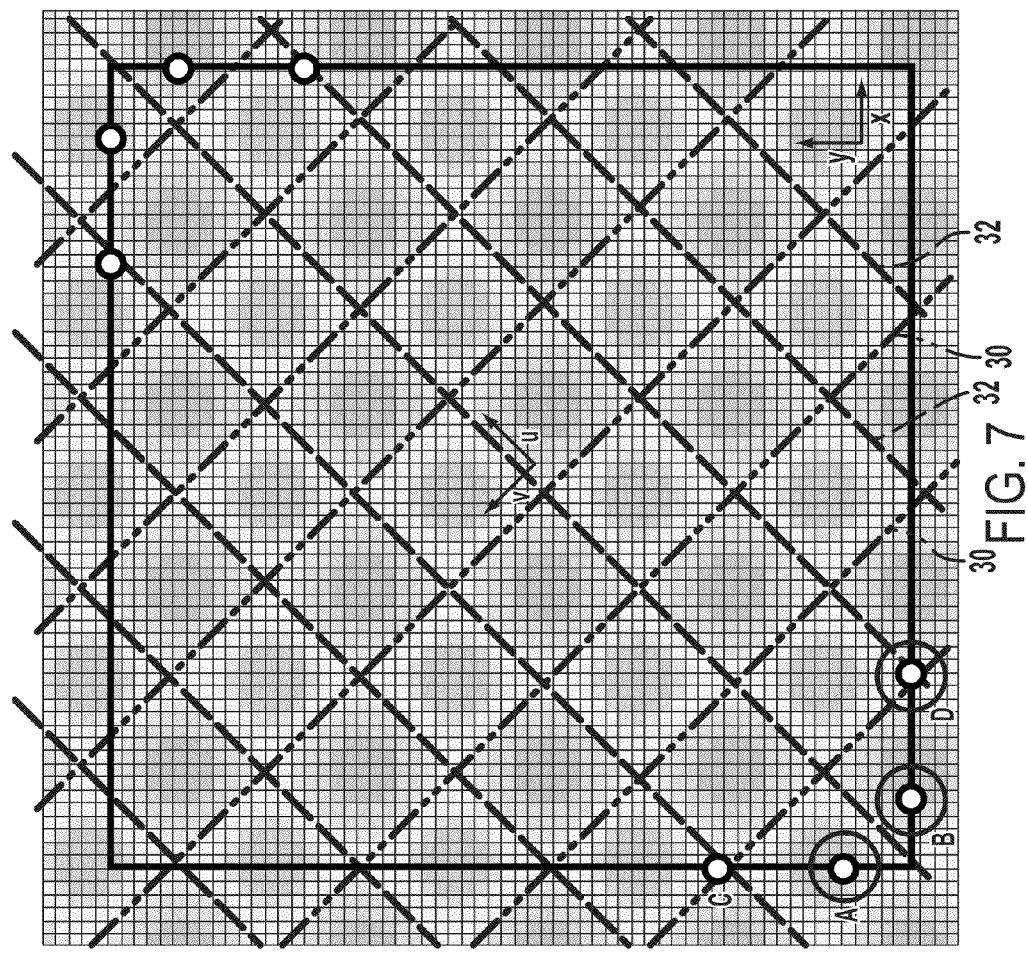
FIG. 7 is a plan view of a region of the stator highlighting three Hall sensors used for determining position of the stage member, and also highlighting lines along which sin(u) and sin(v), respectively, are equal to zero.

Equations (8) and (9) are directed to determining u and v using the three sensors A, B, and D (FIG. 7). However, if A is on a line in which $\sin(v)=0$ (FIG. 7, diagonal lines 32), $$\frac{B_Z(A)}{B_Z(D)} = \frac{\sin(u) \cdot \sin(v)}{-\cos(u) \cdot \sin(v)} \approx \frac{0}{0}. \quad (10)$$

Consequently, equation (8) cannot be used to obtain u. Similarly, if A is on a line in which $\sin(u)=0$ (FIG. 7, diagonal lines 30), $$\frac{B_Z(A)}{B_Z(B)} = \frac{\sin(u) \cdot \sin(v)}{-\sin(u) \cdot \cos(v)} \approx \frac{0}{0}. \quad (11)$$

Equation (9) cannot be used to obtain v.

In view of the special limitation on determining position as described above, the fourth magnetic-field sensor C is used to obtain u and v when the respective ratios noted above equal zero. At the particular stage position and using Equations (3), (4), and (5):

$$\frac{B_Z(B)}{B_Z(C)} = \frac{-\sin(u) \cdot \cos(v)}{\cos(u) \cdot \cos(v)} = -\tan(u), \text{ except when } \cos(v) = 0. \quad (12)$$

and $$\frac{B_Z(D)}{B_Z(C)} = \frac{-\cos(u) \cdot \sin(v)}{\cos(u) \cdot \cos(v)} = -\tan(v), \text{ except when } \cos(u) = 0. \quad (13)$$

Then, from Equations (12) and (13), u and v are determined:

$$u = \tan^{-1}\left(-\frac{B_Z(B)}{B_Z(C)}\right) + \frac{n\lambda}{\pi}, \text{ except when } \cos(v) = 0 \quad (14)$$

and $$v = \tan^{-1}\left(-\frac{B_Z(D)}{B_Z(C)}\right) + \frac{m\lambda}{\pi}, \text{ except when } \cos(u) = 0 \quad (15)$$

wherein n and m are integers and $\lambda$ is the period of the magnetic field over the magnet array.

To summarize:

$$u = \tan^{-1}\left(-\frac{B_Z(A)}{B_Z(D)}\right) + \frac{n\lambda}{\pi}, \text{ except when } \sin(v) = 0. \quad (8)$$

$$u = \tan^{-1}\left(-\frac{B_Z(B)}{B_Z(C)}\right) + \frac{n\lambda}{\pi}, \text{ except when } \cos(v) = 0 \quad (14)$$

$$v = \tan^{-1}\left(-\frac{B_Z(A)}{B_Z(B)}\right) + \frac{m\lambda}{\pi}, \text{ except when } \sin(u) = 0. \quad (9)$$

$$v = \tan^{-1}\left(-\frac{B_Z(D)}{B_Z(C)}\right) + \frac{m\lambda}{\pi}, \text{ except when } \cos(u) = 0 \quad (15)$$

Note that, when $\sin(u)=0$, $\cos(u)=1$. Also, when $\sin(v)=0$, $\cos(v)=1$. Hence, the (u, v) coordinates of point A can be evaluated for any stage position within its range of travel, using only four sensors A-D.

The period of the tangent function is $\pi$, not $2\pi$ as it is for the sine and cosine functions. Direct evaluation of Equations (8), (9), (14), and (15) produces coordinates (denoted (u', v') coordinates) within the respective ranges:

$$-\pi/2 \leq u' \leq \pi/2 \quad (16)$$

and $$-\pi/2 \leq v' \leq \pi/2. \quad (17)$$

Figure 8:
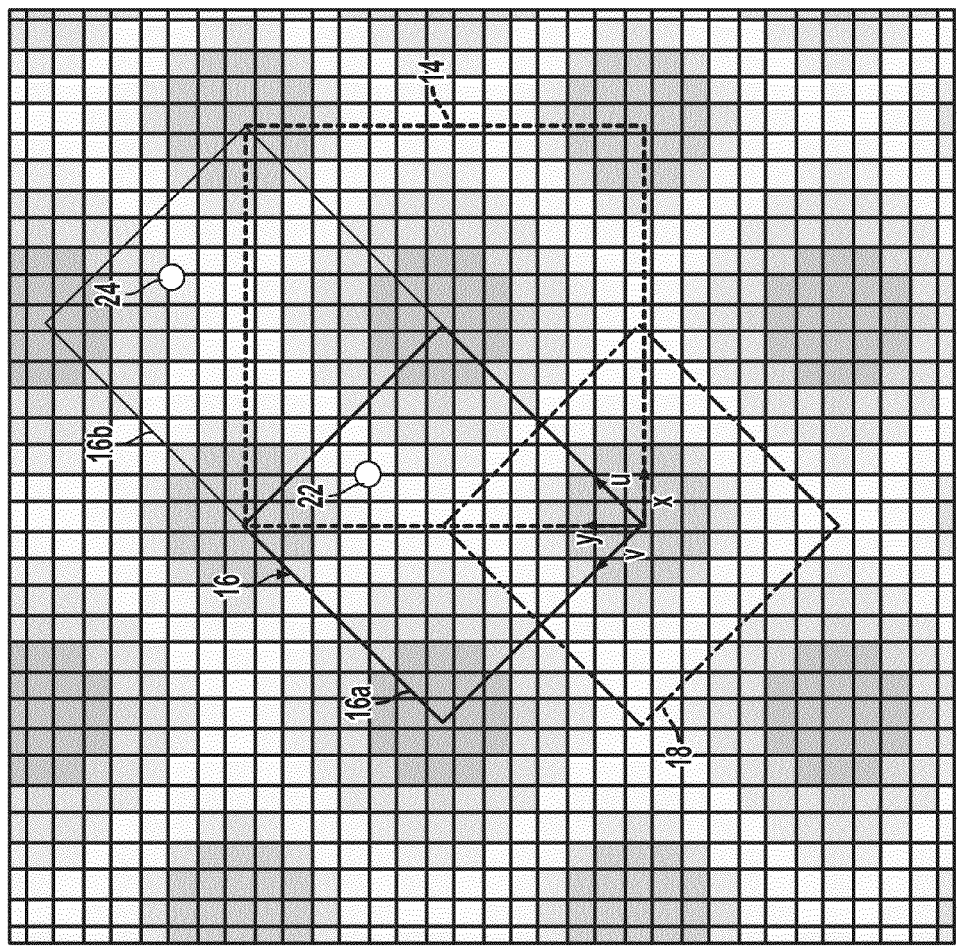
FIG. 8 is a plan view of a region of the stator, including denoted regions in which the period of the tangent functions is π rather than 2π, the latter being the period of the sine and cosine functions.

This range is denoted in FIG. 8 by the square 18. The coordinates u' and V can be remapped into $0 \leq u'' \leq \pi$ and $0 \leq v'' \leq \pi$; this range is denoted in FIG. 8 by the bold-line square 16a. But, as noted above, the actual ranges of u and v are, respectively, $0 \leq u \leq 2\pi$ and $0 \leq v \leq \pi$; this range is denoted in FIG. 8 by the fine-line square 16b.

Returning to FIG. 5, within each rectangle 16, there are two possible positions that need to be distinguished from each other. I.e., there is a need to distinguish between a case in which the stage 20 is located at a point (u", v"), as determined by direct evaluation, versus a case in which the stage is located at the point (u"+$\pi$, v"). These two cases are denoted in FIG. 8 by respective dots 22, 24. To distinguish between these two cases, let $u_1=u'$ and $u_2=u'+R$. Using Equation (2), "predicted" field values are computed for the points $A_1$ and $A_2$:

$$A_1 = \beta \cdot \sin(u_1) \cdot \sin(v) \quad (18)$$

$$A_2 = \beta \cdot \sin(u_2) \cdot \sin(v) \quad (19)$$

Similarly, "predicted" field values can be computed for the points $B_1$ and $B_2$ using Equation (3):

$$B_1 = -\beta \cdot \sin(u_1) \cdot \cos(v) \quad (20)$$

$$B_2 = -\beta \cdot \sin(u_2) \cdot \cos(v) \quad (21)$$

and for the points $C_1$ and $C_2$ using Equation (4):

$$C_1 = \beta \cdot \cos(u_1) \cdot \cos(v) \quad (22)$$

$$C_2 = \beta \cdot \cos(u_2) \cdot \cos(v) \quad (23)$$

and for the points $D_1$ and $D_2$ using Equation (5):

$$D_1 = -\beta \cdot \cos(u_1) \cdot \sin(v) \quad (24)$$

$$D_2 = -\beta \cdot \cos(u2) \cdot \sin(v) \quad (25)$$

Next, a determination is made of whether $u_1$ or $u_2$ best matches the data produced by the sensors A, B, C, D:

$$\text{diff}_1 = (A-A_1)^2 + (B-B_1)^2 + (C-C_1)^2 + (D-D_1)^2 \quad (26)$$

$$\text{diff}_2 = (A-A_2)^2 + (B-B_2)^2 + (C-C_2)^2 + (D-D_2)^2 \quad (27)$$

If $(\text{diff}_1 < \text{diff}_2)$, then $u=u_1$; and if $(\text{diff}_2 < \text{diff}_1)$, then $u=u_2$.

Figure 9:
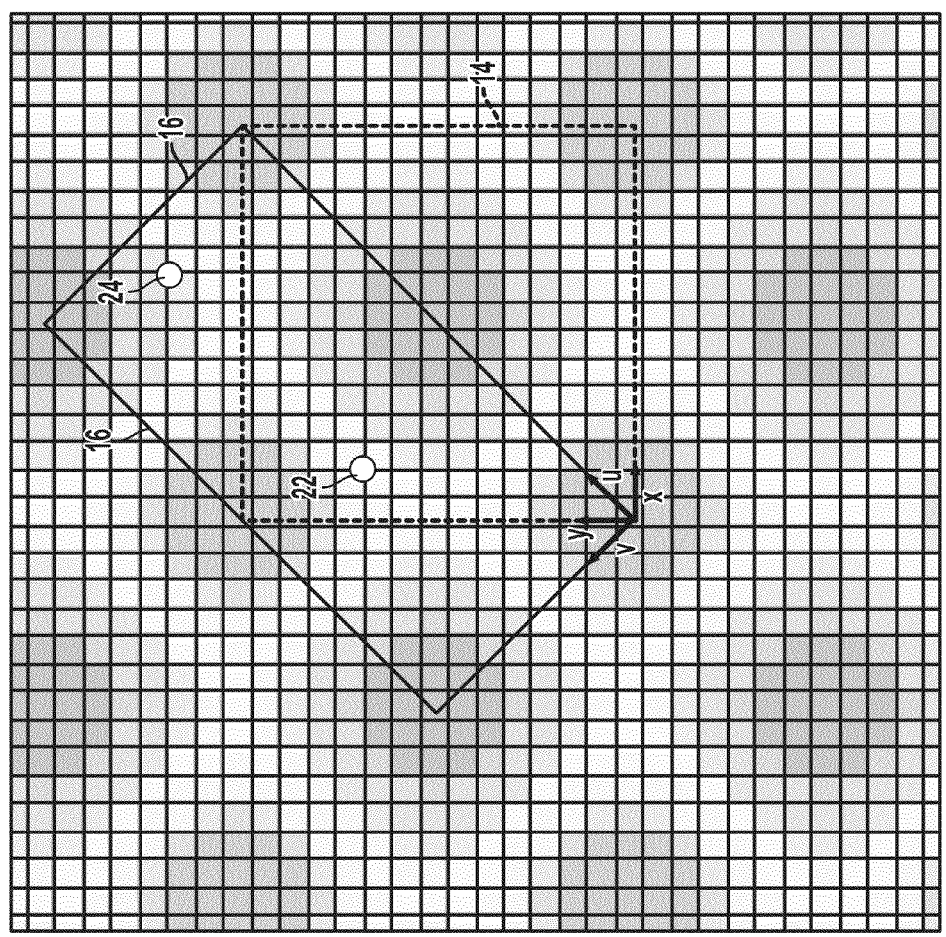
FIG. 9 is a plan view of a region of the stator, similar to FIG. 4, but including two locations to be distinguished from each other but located in the same u, v periodicity region.

The foregoing describes use of $B_z$ measurements to obtain periodic (u, v) coordinates that range over $u=[0, 2\pi]$, $v=[0, \pi]$ within the rectangle 16 in FIG. 9. A coordinate-rotation system can now be used to map the (u, v) coordinates into corresponding (x, y) coordinates having the period $x=[0, 2\pi]$, $y=[0, 2\pi]$ over the square 14 in FIG I.

$$\begin{bmatrix} x \\ y \end{bmatrix} = \begin{bmatrix} 1 & -1 \\ 1 & 1 \end{bmatrix} \cdot \begin{bmatrix} u \\ v \end{bmatrix} \quad (28)$$

$$x = \text{mod}(x, 2\pi) \quad (29)$$

$$y = \text{mod}(y, 2\pi) \quad (30)$$

Finally, the (x, y) position is converted into physical coordinates (x', y') if desired:

$$\begin{bmatrix} x' \\ y' \end{bmatrix} = \frac{\lambda_{xy}}{2\pi} \cdot \begin{bmatrix} x \\ y \end{bmatrix} \quad (31)$$

in which $\lambda_{xy}$ is the physical pitch of the magnet array in (x, y) coordinates.

The foregoing provides a measurement of the "local" (u, v) and (x, y) positions of the point A, using four magnetic-field sensors A, B, C, D. Note that, for most locations (i.e., locations in which the sine or cosine of u or v does not equal zero), position can be determined using only three sensors that are spaced at $\pi/2$ from each other in the u-v directions. A fourth sensor, also spaced $\pi/2$, is used to resolve situations in which the sine or cosine of u or v does equal zero. Although the spacings of the sensors A, B, C, D from each other in the u and v directions are $\pi/2$ in this embodiment, these spacings can be increased by units of $2\pi$, if desired.

Figure 10:
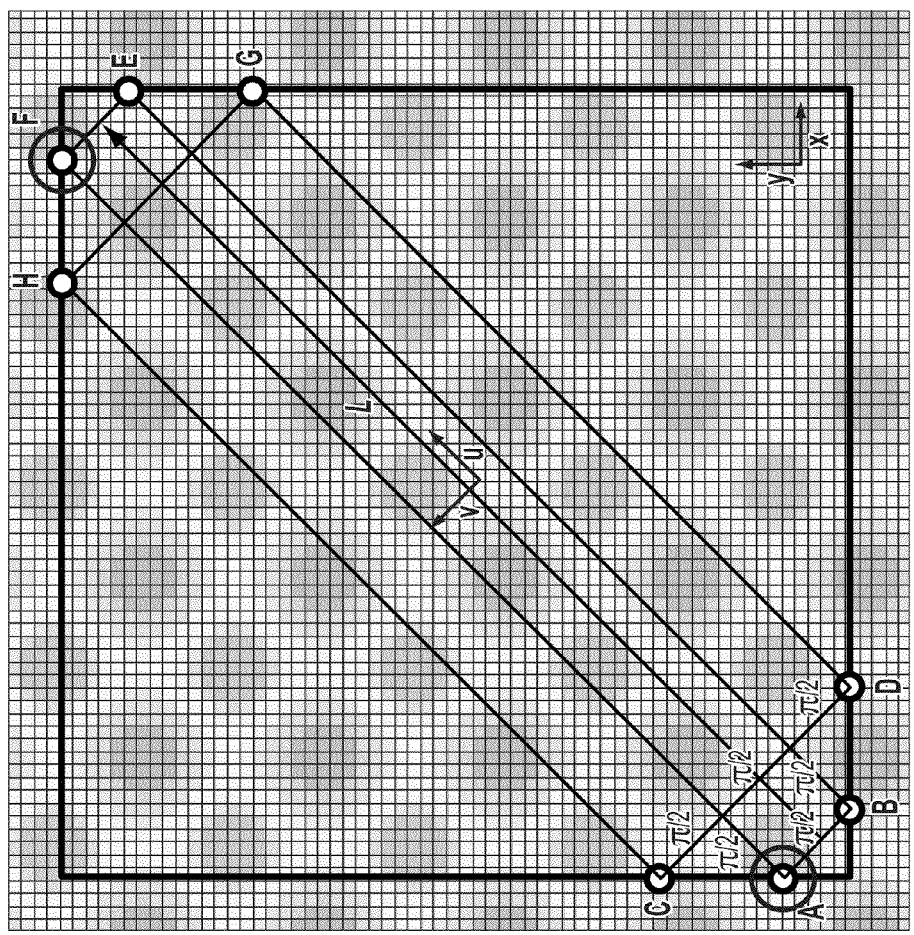
FIG. 10 is a plan view of a region of the stator, highlighting two Hall sensors used for making a determination of stage rotation (yaw or $\theta_z$).

To determine yaw ($\theta_z$) of the stage 20 as well as position, additional magnetic-field sensors are required. In this embodiment, and referring to FIG. 10, the sensors E, F, G, H allow (u, v) and (x, y) coordinates to be derived for a point F, using the same analytical approach as discussed above. By making such a determination, a determination of stage rotation (yaw) can be made. Note that the point F is on a straight line (in the u-direction) from the point A, and that the position of the point F along that line is an integer multiple of $\pi/2$ from the point A. Other than these criteria, pairs of points A and F; B and E; D and G; and C and H can be chosen for convenience for use in the following analysis.

For example, using the points A and F, if the stage rotation is zero (i.e., if $\theta_z=0$), then $v_F=v_A$; if the stage rotation is not zero, then $v_F \cdot v_A$. In the latter case, the possibility must be considered whether u or v has crossed a periodic boundary. Phase-wrapping can be unwrapped using:

$$dv = v_F - v_A \quad (32)$$

If $dv > \pi/2$, then $dv = dv - \pi$; if $dv < -\pi/2$, then $dv = dv + \pi$. Note that this unwrapping process effectively limits the amount of rotation that can be resolved because $-\pi/2 \leq dv \leq \pi/2$.

Figure 11:
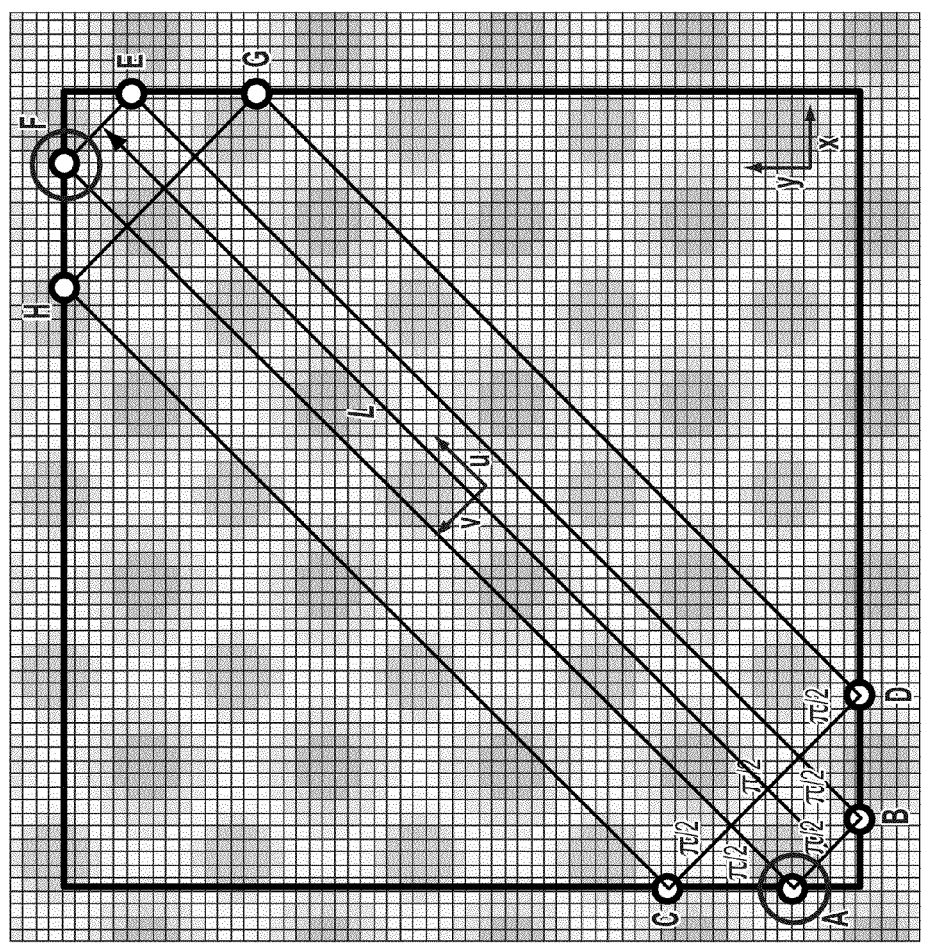
FIG. 11 is a plan view of a region of the stator, showing the distance L (in the u-direction) between the two Hall sensors highlighted in FIG. 10.

Finally, the yaw angle $\theta_z$ of the stage 20 is approximated by:

$$\theta = \sin^{-1}\left(\frac{dv}{L}\right) \quad (33)$$

wherein L is shown on FIG. 11. Note that this determination of yaw is effective only if the difference between $v_A$ and $v_F$ is less than half the magnet period. However, this limitation can be accommodated with microlithography stages since yaw is normally much less than the magnet period. This determination is particularly effective for yaw angles as large as approximately 0.05 radians. In one study, our simulated errors in yaw angle were approximately 2 mrad for an actual yaw rotation of 0.03 radians.

In this embodiment the (x, y) commutation position (including starting or power-on position) of the stage 20 relative to a two-dimensional magnet array of a planar motor driving the stage motion can be determined using as few as four Hall-effect sensors mounted to the stage. The sensors are arranged relative to each other at respective (u, v) coordinates, wherein the u and v directions are at 45° to the respective x- and y-directions, and wherein all four sensors do not have the same u or v coordinate. Desirably, the sensors are spaced apart from each other in the u and v directions at integer units of $\pi/2$, wherein the u-v period of the magnet array is $2\pi$.

Second Representative Embodiment

As discussed in the first representative embodiment, four magnetic-field sensors are utilized to find the relative position, in (u, v) coordinates or (x, y) coordinates, of any reference point on the movable stage portion within one period of the magnet array. Three sensors can be used to determine the position of the movable stage portion at most locations, but not unambiguously at all locations. The fourth sensor is used to deal with singularities, making it possible to determine unambiguously the relative position of the movable stage portion at any location within the magnet array.

When the position of the reference point is being determined, the rotation (yaw; $\theta_z$) of the movable stage portion can be neglected in instances in which the yaw angles are very small in practice.

Figure 12:
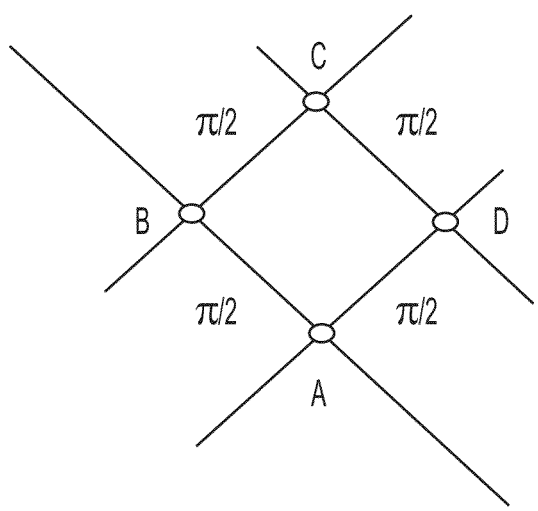
FIG. 12 is a diagram of the "basic arrangement" of four sensors in which the sensors are as close to each other as practicable while preserving the phase difference.

The reference point (the x, y position of which is being determined using four magnetic-field sensors) is arbitrary. The respective position of any of the four sensors can be used as a "reference" (or "calculation origin") point, and the reference-point measurement can be projected to anywhere on the stage. The determination of the position of the reference point exploits the advantages of the specific phase differences between the sensors. The sensors can be placed anywhere on the stage, so long as the required phase differences ($\pi/2$ or integral multiples thereof) between adjacent sensors are established. In this embodiment, the four sensors are placed at the four corners, respectively, of a diamond-shaped arrangement at or near a respective corner of the stage, as shown in FIG. 12, wherein the phase difference is $\pi/2$ and:

$$A=(u_0, v_0)$$

$$B=(u_0, v_0+\pi/2)$$

$$C=(u_0+\pi/2, v_0+\pi/2)$$

$$D=(u_0+\pi/2, v_0)$$

The positions of the sensors can differ from the basic position shown in FIG. 12 by, for example, integral multiples of $\pi$. The computations are essentially the same in each case, except that odd multiples of $\pi$ produce sign changes in the equations. For example:

$$A=(u_0, v_0)$$

$$B=(u_0+j_B\pi, v_0+\pi/2+k_B\pi)$$

$$C=(u_0+\pi/2+j_C\pi, v_0+\pi/2+k_C\pi)$$

$$D=(u_0+\pi/2+j_D\pi, v_0+k_D\pi)$$

wherein $j_B$, $j_C$, $j_D$, $k_B$, $k_C$, and $k_D$ are integers. The particular arrangement of the four Hall sensors is motivated by the following considerations: (1) from a construction point of view, it is easier to place the sensors around the perimeter of the moving stage portion, and (b) keeping the sensors close to each other helps to minimize troubles arising from neglecting stage rotation. For example, in the arrangement of sensors in the first embodiment (FIG. 6), $j_B=j_C=j_D=0$, $k_B=k_D=-1$, and $k_C=0$, yielding the following:

$$A=(u_0, v_0)$$

$$B=(u_0, v_0-\pi/2)$$

$$C=(u_0+\pi/2, v_0+\pi/2)$$

$$D=(u_0+\pi/2, v_0-\pi)$$

To determine the angle of rotation of the stage, the position (in the magnetic array) of two selected reference points located at the stage is determined. Any two points can be used. The choice of the two reference points is a result of the following considerations:

(1) From a construction point of view, it is easier to place the sensors around the perimeter of the stage.

(2) Calculations are simpler when the two selected points used for determining yaw angle lie on a 45° or 135° line relative to the x or y axis of the stage, i.e., when only one of the point coordinates differs. In the first embodiment a 45° line was chosen and the two points differed in their u coordinate.

(3) To resolve the angle with maximum accuracy, the two points desirably are as far apart as possible.

Theoretically, fewer than eight magnetic-field sensors can be used to find the position of two points in the magnetic array. But, this is impractical for the following reasons: Some of the sensors could be common, by which is meant they could both be involved in determining the position of both reference points. This situation is not desirable because the sensors used for determining the position of the same reference point are preferably close to each other to minimize the influence of stage rotation. Also, the sensors used for determining the position of different reference points are preferably far from each other to maximize the sensitivity to rotation angle. If a sensor is used for determining the position of both reference points, these two objectives contradict each other.

Third Representative Embodiment

Figure 13:
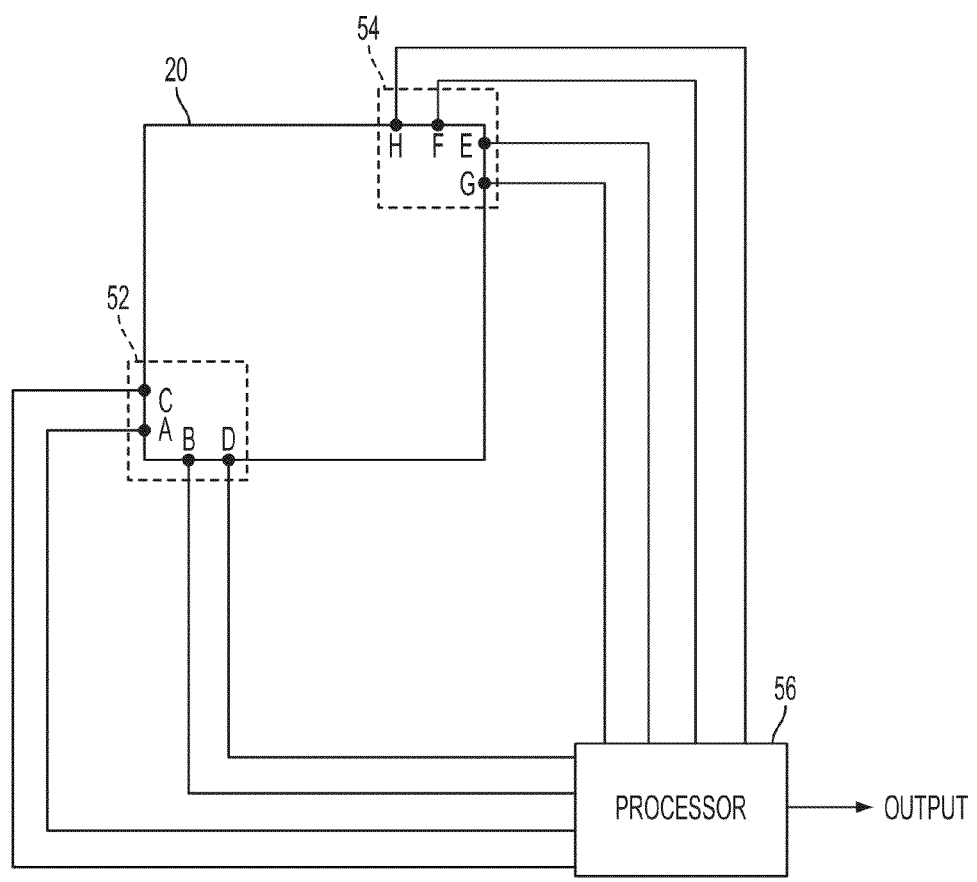
FIG. 13 is a schematic diagram showing eight magnetic field sensors operably connected to a processor.

In this embodiment the two groups 52, 54 of magnetic-field sensors A-D and E-H, respectively are operably connected to a processor 56, as shown in FIG. 13. The first group 52 of four magnetic-field sensors A-D is mounted to the stage 20 that is movable with the mover of the planar motor. The sensors A-D are situated at integer multiples of $\pi/2$ from each other in u- and v-directions of the u-v coordinate system, as discussed above. Each sensor produces respective data regarding a respective component of the magnetic field at the respective sensor. The sensors A-D are operably connected to the processor 56, by which is meant that data from the sensors are supplied to the processor in any of various ways known in the art, and the processor operates based on that data. The processor is configured (by hardware, firmware, and/or software) to determine, from the data received from the sensors, respective $B_z$ fields at the sensors. The processor is also configured to convert the $B_z$ data to corresponding u-v coordinates, and to convert the u-v coordinates to respective x-y coordinates.

The second group 54 of four magnetic-field sensors E-H is also mounted to the stage 20. The sensors E-H are situated at integer multiples of $\pi/2$ from each other in n- and v-directions of the u-v coordinate system, as discussed above. Each sensor produces respective data regarding a respective component of the magnetic field at the respective sensor. The sensors E-H are operably connected to the processor 56, which is configured to determine, from the data received from the sensors, respective $B_z$ fields at the sensors. The processor is also configured to convert the $B_z$ data to corresponding u-v coordinates, and to convert the u-v coordinates to respective x-y coordinates. The processor 56 also configured to compare the u-v coordinates from the second group 54 with the u-v coordinates obtained by the first group 52 to determine a difference in these coordinates, and to determine from the difference the yaw of the stage 20.

Precision System

An example of a precision system with which electromagnetic actuators as described herein, particularly linear and/or planar motors, can be used is an immersion microlithography system.

Figure 14:
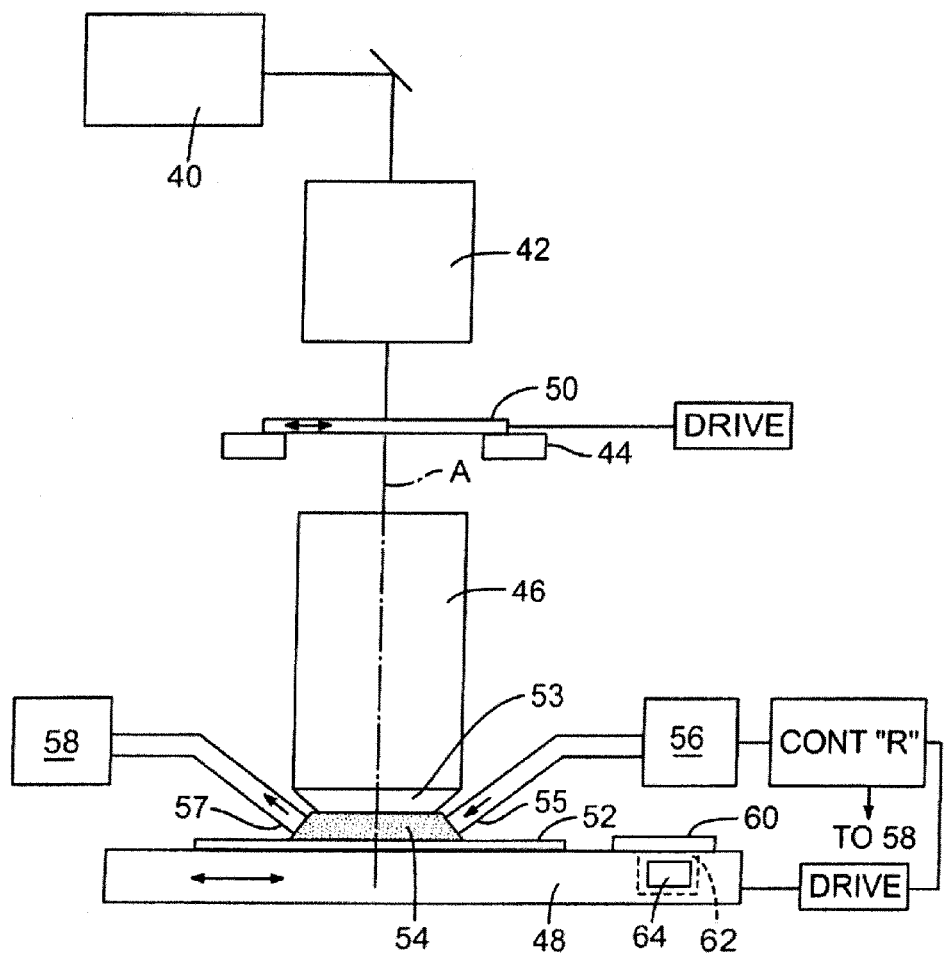
FIG. 14 is a schematic diagram of an immersion microlithography system as described briefly in the seventh representative embodiment and which is a first example of a precision system including one or more electromagnetic actuators as described herein.

Turning now to FIG. 14, certain features of an immersion lithography system are shown, namely, a light source 540, an illumination-optical system 542, a reticle stage 544, a projection-optical system 546, and a wafer (substrate) stage 548, all arranged along an optical axis A. The light source 540 is configured to produce a pulsed beam of illumination light, such as DUV light of 248 nm as produced by a KrF excimer laser, DUV light of 193 nm as produced by an ArF excimer laser, or DUV light of 157 nm as produced by an $F_2$ excimer laser. The illumination-optical system 542 includes an optical integrator and at least one lens that conditions and shapes the illumination beam for illumination of a specified region on a patterned reticle 550 mounted to the reticle stage 544. The pattern as defined on the reticle 550 corresponds to the pattern to be transferred lithographically to a wafer 552 that is held on the wafer stage 548. Lithographic transfer in this system is by projection of an aerial image of the pattern from the reticle 550 to the wafer 552 using the projection-optical system 546. The projection-optical system 546 typically comprises many individual optical elements (not detailed) that project the image at a specified demagnification ratio (e.g., ¼ or ⅕) on the wafer 552. So as to be imprintable, the wafer surface is coated with a layer of a suitable exposure-sensitive material termed a "resist."

The reticle stage 544 is configured to move the reticle 550 in the X-direction, Y-direction, and rotationally about the Z-axis. To such end, the reticle stage is equipped with one or more linear motors having cooled coils as described herein. The two-dimensional position and orientation of the reticle 550 on the reticle stage 544 are detected by a laser interferometer (not shown) in real time, and positioning of the reticle 550 is effected by a main control unit on the basis of the detection thus made.

The wafer 552 is held by a wafer holder ("chuck," not shown) on the wafer stage 548. The wafer stage 548 includes a mechanism (not shown) for controlling and adjusting, as required, the focusing position (along the Z-axis) and the tilting angle of the wafer 552. The wafer stage 548 also includes electromagnetic actuators (e.g., linear motors or a planar motor, or both) for moving the wafer in the X-Y plane substantially parallel to the image-formation surface of the projection-optical system 546. These actuators desirably comprise linear motors, one more planar motors, or both.

The wafer stage 548 also includes mechanisms for adjusting the tilting angle of the wafer 552 by an auto-focusing and auto-leveling method. Thus, the wafer stage serves to align the wafer surface with the image surface of the projection-optical system. The two-dimensional position and orientation of the wafer are monitored in real time by another laser interferometer (not shown). Control data based on the results of this monitoring are transmitted from the main control unit to a drive circuits for driving the wafer stage. During exposure, the light passing through the projection-optical system is made to move in a sequential manner from one location to another on the wafer, according to the pattern on the reticle in a step-and-repeat or step-and-scan manner.

The projection-optical system 546 normally comprises many lens elements that work cooperatively to form the exposure image on the resist-coated surface of the wafer 552. For convenience, the most distal optical element (i.e., closest to the wafer surface) is an objective lens 553. Since the depicted system is an immersion lithography system, it includes an immersion liquid 554 situated between the objective lens 553 and the surface of the wafer 552. As discussed above, the immersion liquid 554 is of a specified type. The immersion liquid is present at least while the pattern image of the reticle is being exposed onto the wafer.

The immersion liquid 554 is provided from a liquid-supply unit 556 that may comprise a tank, a pump, and a temperature regulator (not individually shown). The liquid 554 is gently discharged by a nozzle mechanism 555 into the gap between the objective lens 553 and the wafer surface. A liquid-recovery system 558 includes a recovery nozzle 57 that removes liquid from the gap as the supply 56 provides fresh liquid 554. As a result, a substantially constant volume of continuously replaced immersion liquid 554 is provided between the objective lens 553 and the wafer surface. The temperature of the liquid is regulated to be approximately the same as the temperature inside the chamber in which the lithography system itself is disposed.

Also shown is a sensor window 560 extending across a recess 562, defined in the wafer stage 548, in which a sensor 564 is located. Thus, the window 560 sequesters the sensor 564 in the recess 562. Movement of the wafer stage 548 so as to place the window 560 beneath the objective lens 553, with continuous replacement of the immersion fluid 554, allows a beam passing through the projection-optical system 546 to transmit through the immersion fluid and the window 560 to the sensor 564.

Figure 15:
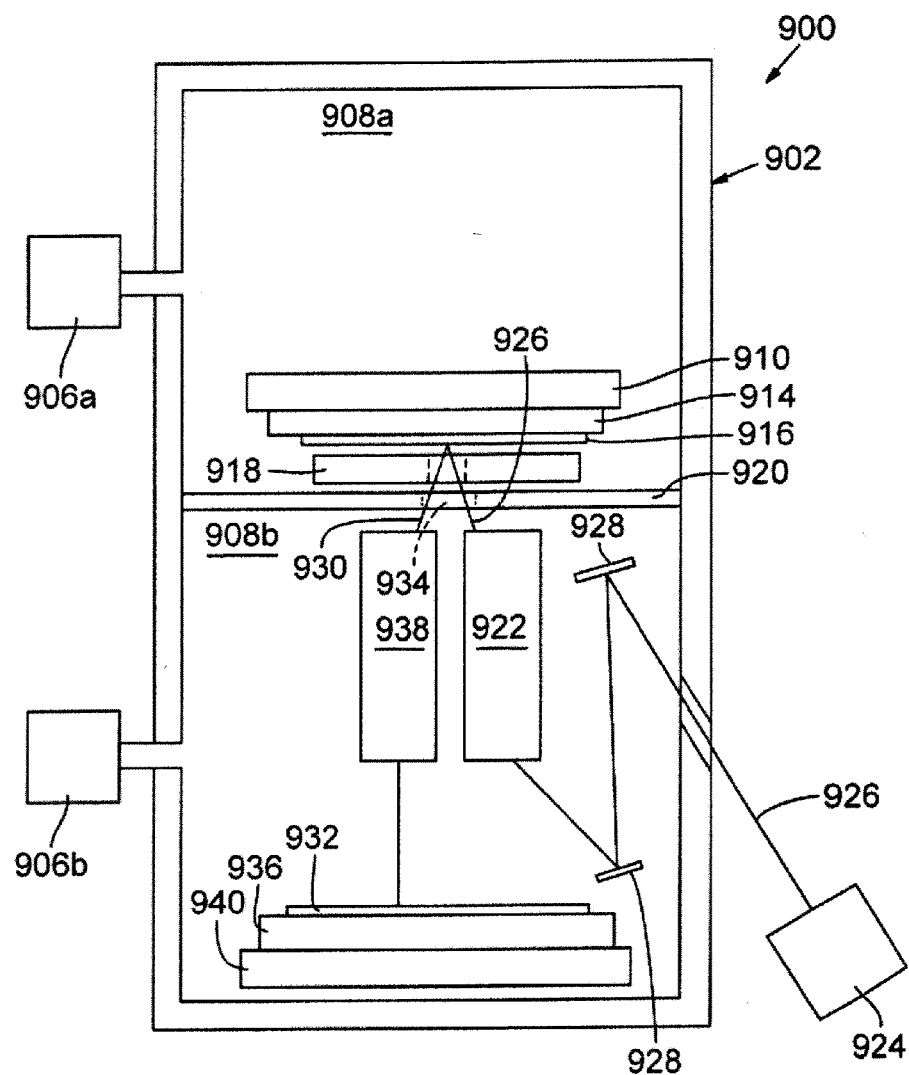
FIG. 15 is a schematic diagram of an extreme-UV microlithography system as described briefly in the seventh representative embodiment and which is a second example of a precision system including one or more electromagnetic actuators as described herein.

Referring now to FIG. 15, an alternative embodiment of a precision system that can include one or more electromagnetic actuators having actively cooled coils as described herein is an EUVL system 900, as a representative precision system incorporating an electromagnetic actuator as described herein, is shown. The depicted system 900 comprises a vacuum chamber 902 including vacuum pumps 906a, 906b that are arranged to enable desired vacuum levels to be established and maintained within respective chambers 908a, 908b of the vacuum chamber 902. For example, the vacuum pump 906a maintains a vacuum level of approximately 50 mTorr in the upper chamber (reticle chamber) 908a, and the vacuum pump 906b maintains a vacuum level of less than approximately 1 mTorr in the lower chamber (optical chamber) 908b. The two chambers 908a, 908b are separated from each other by a barrier wall 920. Various components of the EUVL system 900 are not shown, for ease of discussion, although it will be appreciated that the EUVL system 900 can include components such as a reaction frame, a vibration-isolation mechanism, various actuators, and various controllers.

An EUV reticle 916 is held by a reticle chuck 914 coupled to a reticle stage 910. The reticle stage 910 holds the reticle 916 and allows the reticle to be moved laterally in a scanning manner, for example, during use of the reticle for making lithographic exposures. Between the reticle 916 and the barrier wall 920 is a blind apparatus. An illumination source 924 produces an EUV illumination beam 926 that enters the optical chamber 908b and reflects from one or more mirrors 928 and through an illumination-optical system 922 to illuminate a desired location on the reticle 916. As the illumination beam 926 reflects from the reticle 916, the beam is "patterned" by the pattern portion actually being illuminated on the reticle. The barrier wall 920 serves as a differential-pressure barrier and can serve as a reticle shield that protects the reticle 916 from particulate contamination during use. The barrier wall 920 defines an aperture 934 through which the illumination beam 926 may illuminate the desired region of the reticle 916. The incident illumination beam 926 on the reticle 916 becomes patterned by interaction with pattern-defining elements on the reticle, and the resulting patterned beam 930 propagates generally downward through a projection-optical system 938 onto the surface of a wafer 932 held by a wafer chuck 936 on a wafer stage 940 that performs scanning motions of the wafer during exposure. Hence, images of the reticle pattern are projected onto the wafer 932.

The wafer stage 940 can include (not detailed) a positioning stage that may be driven by a planar motor or one or more linear motors, for example, and a wafer table that is magnetically coupled to the positioning stage using an EI-core actuator, for example. The wafer chuck 936 is coupled to the wafer table, and may be levitated relative to the wafer table by one or more voice-coil motors, for example. If the positioning stage is driven by a planar motor, the planar motor typically utilizes respective electromagnetic forces generated by magnets and corresponding armature coils arranged in two dimensions. The positioning stage is configured to move in multiple degrees of freedom of motion, e.g., three to six degrees of freedom, to allow the wafer 932 to be positioned at a desired position and orientation relative to the projection-optical system 938 and the reticle 916.

An EUVL system including the above-described EUV-source and illumination-optical system can be constructed by assembling various assemblies and subsystems in a manner ensuring that prescribed standards of mechanical accuracy, electrical accuracy, and optical accuracy are met and maintained. To establish these standards before, during, and after assembly, various subsystems (especially the illumination-optical system 922 and projection-optical system 938) are assessed and adjusted as required to achieve the specified accuracy standards. Similar assessments and adjustments are performed as required of the mechanical and electrical subsystems and assemblies. Assembly of the various subsystems and assemblies includes the creation of optical and mechanical interfaces, electrical interconnections, and plumbing interconnections as required between assemblies and subsystems. After assembling the EUVL system, further assessments, calibrations, and adjustments are made as required to ensure attainment of specified system accuracy and precision of operation. To maintain certain standards of cleanliness and avoidance of contamination, the EUVL system (as well as certain subsystems and assemblies of the system) are assembled in a clean room or the like in which particulate contamination, temperature, and humidity are controlled.

Figure 16:
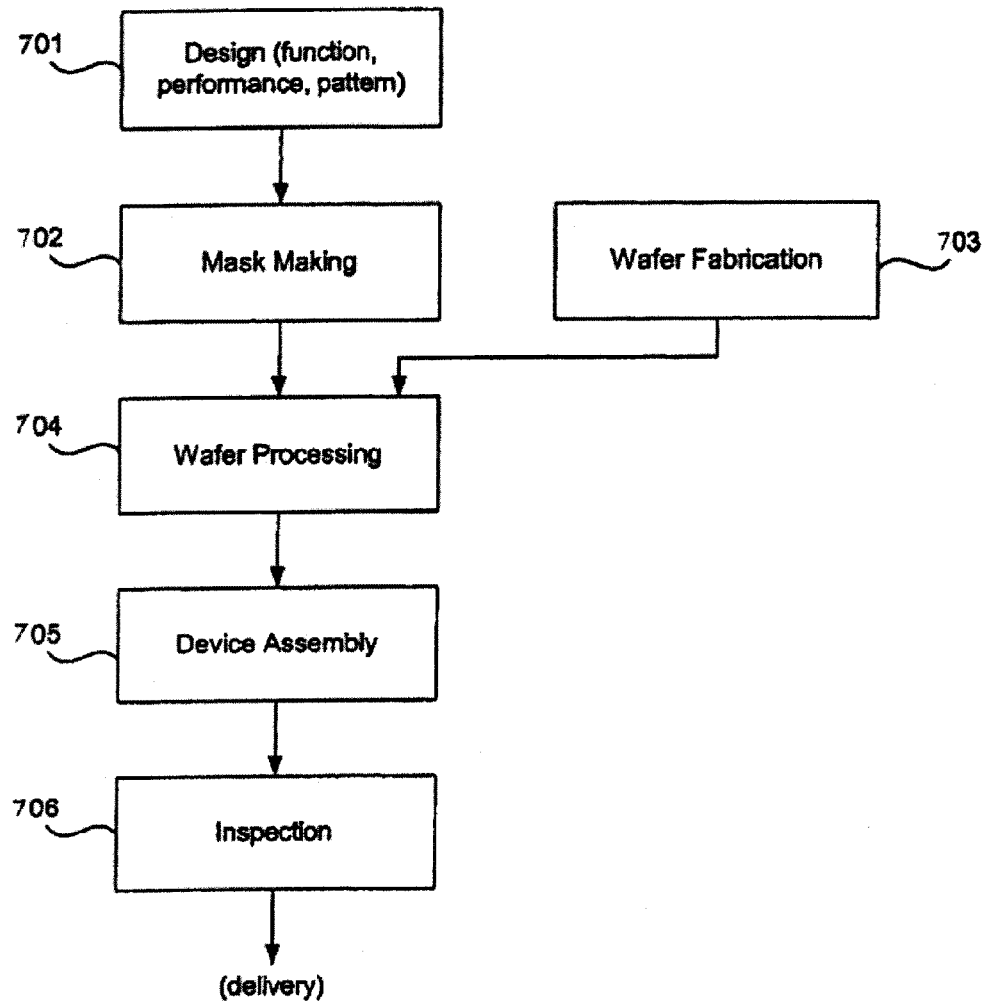
FIG. 16 is a process-flow diagram depicting exemplary steps associated with a process for fabricating semiconductor devices.

Semiconductor devices can be fabricated by processes including microlithography steps performed using a microlithography system as described above. Referring to FIG. 16, in step 701 the function and performance characteristics of the semiconductor device are designed. In step 702 a reticle ("mask") defining the desired pattern is designed and fabricated according to the previous design step. Meanwhile, in step 703, a substrate (wafer) is fabricated and coated with a suitable resist. In step 704 ("wafer processing") the reticle pattern designed in step 702 is exposed onto the surface of the substrate using the microlithography system. In step 705 the semiconductor device is assembled (including "dicing" by which individual devices or "chips" are cut from the wafer, "bonding" by which wires are bonded to particular locations on the chips, and "packaging" by which the devices are enclosed in appropriate packages for use). In step 706 the assembled devices are tested and inspected.

Figure 17:
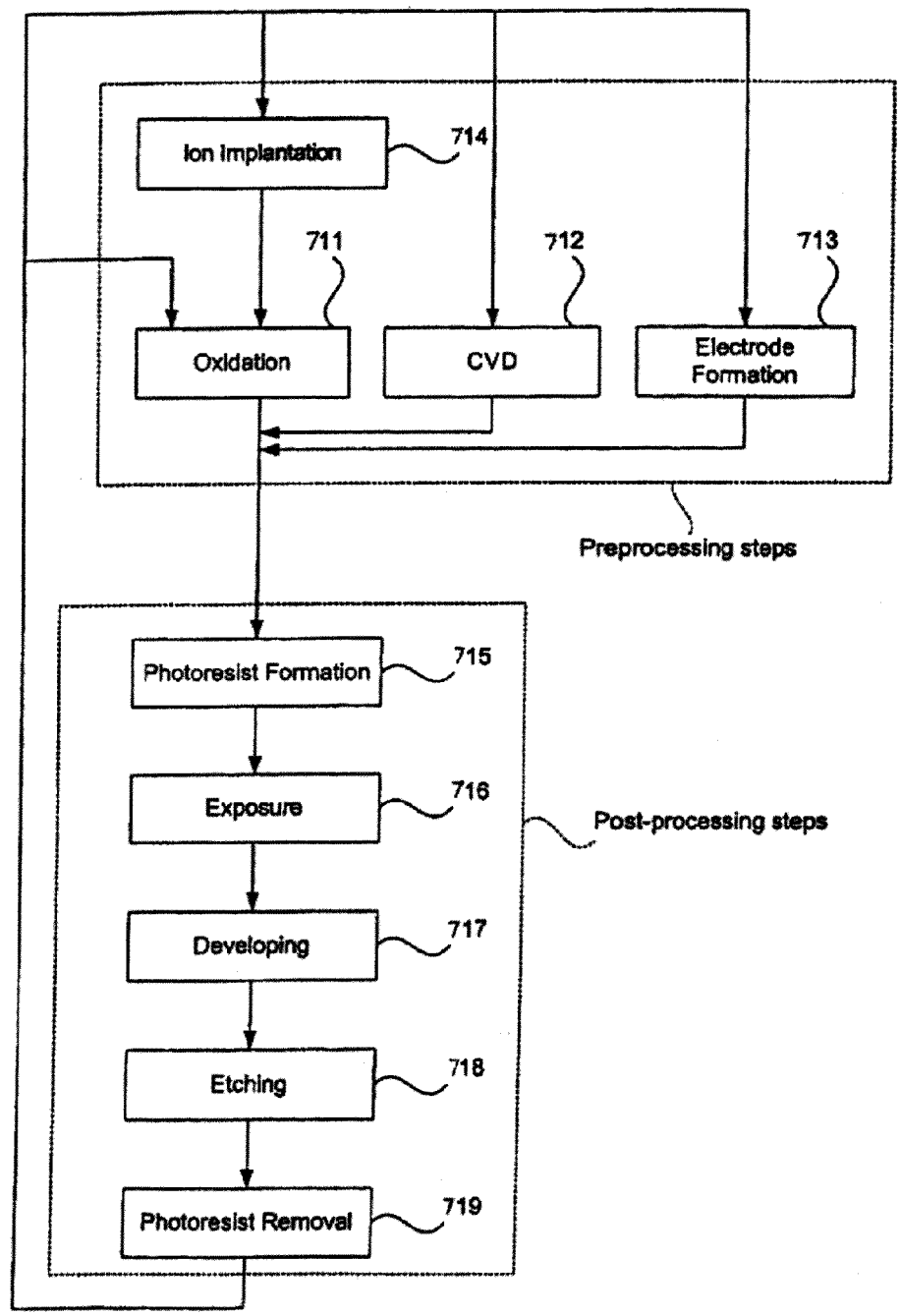
FIG. 17 is a process-flow diagram depicting exemplary steps associated with a processing a substrate (e.g., a wafer), as would be performed, for example, in step 704 in the process shown in FIG. 16.

Representative details of a wafer-processing process including a microlithography step are shown in FIG. 17. In step 711 ("oxidation") the wafer surface is oxidized. In step 712 ("CVD") an insulative layer is formed on the wafer surface by chemical-vapor deposition. In step 713 (electrode formation) electrodes are formed on the wafer surface by vapor deposition, for example. In step 714 ("ion implantation") ions are implanted in the wafer surface. These steps 711-714 constitute representative "pre-processing" steps for wafers, and selections are made at each step according to processing requirements.

At each stage of wafer processing, when the pre-processing steps have been completed, the following "post-processing" steps are implemented. A first post-process step is step 715 ("photoresist formation") in which a suitable resist is applied to the surface of the wafer. Next, in step 716 ("exposure"), the microlithography system described above is used for lithographically transferring a pattern from the reticle to the resist layer on the wafer. In step 717 ("developing") the exposed resist on the wafer is developed to form a usable mask pattern, corresponding to the resist pattern, in the resist on the wafer. In step 718 ("etching"), regions not covered by developed resist (i.e., exposed material surfaces) are etched away to a controlled depth. In step 719 ("photoresist removal"), residual developed resist is removed ("stripped") from the wafer.

Formation of multiple interconnected layers of circuit patterns on the wafer is achieved by repeating the pre-processing and post-processing steps as required. Generally, a set of pre-processing and post-processing steps are conducted to form each layer.

Whereas the invention has been described in connection with representative embodiments, it will be understood that it is not limited to those embodiments. On the contrary, it is intended to encompass all alternatives, modifications, and equivalents as may be included within the spirit and scope of the invention as defined by the appended claims.

What is claimed is:

1. A stage apparatus, comprising:
a motor comprising a planar stator and a moving-coil mover, the stator being a checkerboard magnet array that extends in an x-y plane and produces a periodic magnetic field having a magnetic-field period of $2\pi$ in a u-v coordinate system that is rotated 45° from an x-y coordinate system of the plane;
a stage coupled to the mover so as to move with corresponding motions of the mover relative to the stator; and
a position-measurement device, comprising at least a first group of four magnetic-field sensors coupled to the stage so as to be movable with the stage, the sensors being situated at integer multiples of $\pi/2$ from each other in u- and v-directions of the u-v coordinate system, the sensors producing respective data regarding a respective component of the magnetic field at, and hence the position of, the respective sensor within the period of the magnetic field.

2. The apparatus of claim 1, wherein:
the position-measurement device further comprises a second group of magnetic-field sensors mounted so as to be movable with the stage along with the first group but spaced apart from the first group;
the sensors of the second group are situated at integer multiples of $\pi/2$ from each other in the u- and v-directions; and
the sensors of the second group produce respective data regarding respective components of the magnetic field at the respective sensor, the data being comparable to the data from the first group in a determination of stage yaw.

3. The apparatus of claim 1, wherein:
the stage has a periphery; and
the sensors are mounted on the periphery.

4. The apparatus of claim 1, further comprising a processor operably connected to the sensors, the processor being configured to determine, from the data received from the sensors, respective B: fields at the sensors, convert the $B_z$ data to corresponding u-v coordinates, and convert the u-v coordinates to respective x-y coordinates.

5. The apparatus of claim 1 further comprising a second group of four magnetic-field sensors mounted so as to be movable with the mover along with the first group but spaced apart from the first group, the sensors of the second group being situated at integer multiples of $\pi/2$ from each other in the u- and v-directions, the sensors of the second group producing respective data regarding respective components of the magnetic field at the respective sensor.

6. The apparatus of claim 5, wherein:
the sensors of the second group are connected to the processor; and
the processor is further configured to determine, from the data received from the sensors, respective $B_z$ fields at the sensors, convert the $B_z$ data to corresponding u-v coordinates, compare the u-v coordinates from the second group with the u-v coordinates obtained by the first group to determine a difference in said coordinates, and determine from the difference a yaw of the mover.

7. A precision system, comprising the apparatus recited in claim 1.

8. An apparatus for determining an x-y commutation position of a mover of a moving-coil planar motor of which a stator is a checkerboard magnet array extending in an x-y plane, the stator producing a periodic magnetic field having a magnetic-field period of $2\pi$ in a u-v coordinate system that is rotated 45° from an x-y coordinate system of the plane, the apparatus comprising:
a first group of four magnetic-field sensors mounted so as to be movable with the mover, the sensors being situated at integer multiples of $\pi/2$ from each other in n- and v-directions of the u-v coordinate system, the sensors producing respective data regarding a respective component of the magnetic field at the respective sensor; and
a processor operably connected to the sensors, the processor being configured to determine, from the data received from the sensors, respective $B_z$ fields at the sensors, convert the $B_z$ data to corresponding u-v coordinates, and convert the u-v coordinates to respective x-y coordinates.

9. The apparatus of claim 8, further comprising a stage coupled to the mover, wherein the four sensors of the first group are mounted on a periphery of the stage.

10. The apparatus of claim 9, wherein the four sensors of the first group are mounted on respective locations on one or more edges of the stage adjacent a first corner of the stage.

11. The apparatus of claim 8, wherein the processor is further configured to resolve a situation in which a u or v coordinate could be either of two values out of phase by an integer multiple of $\pi/2$ relative to each other.

12. The apparatus of claim 11, wherein the processor resolves the situation by:
obtaining respective data from the four sensors of the group for each value;
determining predicted $B_z$ values for respective sensors; and
determining which predicted $B_z$ value better matches the respective data produced by the four sensors.

13. The apparatus of claim 8, wherein the sensors in first group are arranged in a basic arrangement in which:
a first sensor of the group has u-v coordinates $(u_0, v_0)$,
a second sensor of the group has u-v coordinates $(u_0, v_0+\pi/2)$,
a third sensor of the group has u-v coordinates $(u_0+\pi/2, v_0+\pi/2)$, and
a fourth sensor of the group has u-v coordinates $(u_0+\pi/2, v_0)$.

14. The apparatus of claim 13, wherein the sensors in the first group are arranged in an arrangement in which:
the first sensor of the group has u-v coordinates $(u_0, v_0)$,
the second sensor of the group has u-v coordinates $(u_0+j_B\pi, v_0+\pi/2+k_B\pi)$,
the third sensor of the group has u-v coordinates $(u_0+\pi/2+j_C\pi, v_0+\pi/2+k_C\pi)$, and
the fourth sensor of the group has u-v coordinates $(u_0+\pi/2+j_D\pi, v_0+k_D\pi)$,
wherein $j_B$, $j_C$, $j_D$, $k_B$, $k_C$, and $k_D$ are integers.

15. The apparatus of claim 8, wherein the sensors in the first group are respective Hall-effect sensors.

16. A precision system, comprising the apparatus recited in claim 8.

17. The precision system of claim 16, configured as a lithography system.

18. In a process for manufacturing a micro-device, a lithography step performed using the lithography system of claim 17.

19. A method for determining an x-y position of a mover of a planar motor, the planar motor having a magnet array cooperating with the mover to generate force and extending in an x-y plane, the magnet array producing a periodic magnetic field having a magnetic-field period of $2\pi$ in a u-v coordinate system that is rotated a predetermined angle from an x-y coordinate system of the plane, the method comprising:
placing a first group of magnetic-field sensors so as to be movable with the mover, the sensors being placed at integer multiples of $\pi/2$ from each other in u- and v-directions of the u-v coordinate system;
selecting a reference sensor from the first group;
determining a respective $B_z$ magnetic field at the reference sensor and at one or more of the remaining sensors in the first group;
converting the $B_z$ data to corresponding u and v coordinates; and
mapping the u and v coordinates onto corresponding x and y coordinates of the mover position.

20. The method of claim 19, further comprising determining yaw of the mover.

21. The method of claim 20, wherein determining yaw comprises:
placing a second group of magnetic-field sensors so as to be movable with the mover, the sensors being placed at integer multiples of π/2 from each other in u- and v-directions of the u-v coordinate system;
selecting a reference sensor from the second group that corresponds to the reference sensor of the first group and is located on a line extending at a predetermined angle relative to an x-direction line of the magnet array;
determining a respective $B_z$ magnetic field at, at least, the reference sensor of the second group of sensors;
converting the $B_z$ data to corresponding u and v coordinates;
comparing the u and v coordinates obtained from the second group with the u and v coordinates obtained from the first group; and
based on a difference in respective u and v coordinates obtained from the first and second groups, determining the yaw of the mover.

22. A stage apparatus, comprising:
a motor comprising a coil array and a magnet array, the magnet array extending in an x-y plane and producing a periodic magnetic field having a magnetic-field period of 2π in a u-v coordinate system that is rotated a predetermined angle from an x-y coordinate system of the plane;
a stage coupled to one of the coil array and magnetic array so as to generate relative motion between the coil array and the magnet array; and
a position-measurement device, comprising at least a first group of magnetic-field sensors coupled to the stage so as to be movable with the stage, the sensors being situated at integer multiples of π/2 from each other in u- and v-directions of the u-v coordinate system, the sensors producing respective data regarding a respective component of the magnetic field at, and hence the position of, the respective sensor within the period of the magnetic field.

23. A method for determining a position of an x-y mover position of a mover of a planar motor which has a magnet array cooperating with the mover to generate force and extending in an x-y plane, the magnet array producing a periodic magnetic field having a magnetic-field period of 2π in a u-v coordinate system that is rotated a predetermined angle from an x-y coordinate system of the plane, the method comprising:
placing a magnetic-field sensor so as to be movable with the mover, a sensor being placed at integer multiples of π/2 from each other in u- and v-directions of the u-v coordinate system;
selecting a reference sensor from the first group;
determining a respective $B_z$ magnetic field at the reference sensor and at one or more of the remaining sensors in the first group; and
converting the $B_z$ data to corresponding u and v coordinates.

24. A stage apparatus, comprising:
a first member;
a second member, which is movable relative to the first member;
a motor comprising a coil array provided to the first member and a magnet array provided to the second member, the motor generating a relative motion between the first member and the second member, the magnet array extending in an x-y plane and producing a periodic magnetic field having a magnetic-field period of 2π in a u-v coordinate system that is rotated a predetermined angle from an x-y coordinate system of the plane; and
a position-measurement device, comprising at least a first group of magnetic-field sensors provided to the first member, the sensors being situated at integer multiples of π/2 from each other in u- and v-directions of the u-v coordinate system, the sensors producing respective data regarding a respective component of the magnetic field at, and hence the position of, the respective sensor within the period of the magnetic field.

25. The apparatus of claim 24, wherein:
the position-measurement device further comprises a second group of magnetic-field sensors provided to the first member, the second group of magnetic-field sensors being spaced apart from the first group;
the sensors of the second group are situated at integer multiples of π/2 from each other in u- and v-directions; and
the sensors of the second group produce respective data regarding respective components of the magnetic field at the respective sensor, the data being comparable to the data from the first group in a determination of yaw of the first member.

26. The apparatus of claim 24, further comprising a processor operably connected to the sensors, the processor being configured to determine, from the data received from the sensors, respective $B_z$ fields at the sensors, to convert the $B_z$ data to corresponding u-v coordinates, and to convert the u-v coordinates to respective x-y coordinates.

27. The apparatus of claim 24, wherein the first member comprises a stage configured to hold an object.

28. An exposure apparatus comprising the stage apparatus of claim 24.

29. A device manufacturing method, comprising:
projecting an image of a pattern onto a wafer using the exposure apparatus of claim 28 to produce an exposed wafer; and
developing the exposed wafer.

30. A method for determining a relative position between a first member of a planar motor and a second member of a planar motor, the planar motor comprising a coil array provided to the first member and a magnet array provided to the second member, the magnet array cooperating with the coil array to generate force and extending in an x-y plane, the method comprising:
producing a periodic magnetic field by the magnet array, the periodic magnetic field having a magnetic-field period of π in a u-v coordinate system that is rotated a predetermined angle from an x-y coordinate system of the x-y plane;
at the first member, placing magnetic-field sensors at integer multiples of π/2 from each other in u- and v-directions of the u-v coordinate system;
selecting a reference sensor from the magnetic-field sensors;
at one or more of the magnetic-field sensors and at the reference sensor, determining respective $B_z$ magnetic fields; and
converting the $B_z$ data to corresponding u and v coordinates.

31. The method of claim 30, further comprising determining yaw of the first member.

* * * * *